United States Patent

Oba et al.

[19]

[11] Patent Number: 5,957,800

[45] Date of Patent: Sep. 28, 1999

[54] SHIFT CONTROL SYSTEM FOR AUTOMATIC TRANSMISSION

[75] Inventors: Hidehiro Oba, Aichi-ken; Kagenori Fukumura, Toyota; Yasuo Hojo, Nagoya; Atsushi Tabata; Hiromichi Kimura, both of Okazaki; Masato Kaigawa, Toyota; Masahiko Ando, Okazaki; Akira Fukatsu, Anjo; Yoshihisa Yamamoto, Nishio; Masahiro Hayabuchi, Anjo; Kazumasa Tsukamoto, Toyota, all of Japan

[73] Assignees: Toyota Jidosha Kabushiki Kaisha, Toyota; Aishin A.W. Co., Ltd., Anjo, both of Japan

[21] Appl. No.: 08/850,383

[22] Filed: May 2, 1997

Related U.S. Application Data

[62] Division of application No. 08/253,301, Jun. 3, 1994, Pat. No. 5,665,027.

[30] Foreign Application Priority Data

Jun. 3, 1993 [JP] Japan .................................. 5-157986
Jun. 3, 1993 [JP] Japan .................................. 5-157992

[51] Int. Cl.⁶ .................................................. B60K 41/04
[52] U.S. Cl. ........................ 475/119; 477/130; 477/906; 475/127
[58] Field of Search .................................. 477/127, 130, 477/109, 906; 701/59, 62; 475/119, 127; 192/3.63, 3.52, 3.58

[56] References Cited

U.S. PATENT DOCUMENTS

| | | |
|---|---|---|
| 3,631,950 | 1/1972 | Tanaka . |
| 4,414,863 | 11/1983 | Heino ................................. 477/906 X |
| 4,555,964 | 12/1985 | Sugano . |
| 4,903,549 | 2/1990 | Ueki et al. . |
| 5,012,699 | 5/1991 | Aoki et al. . |
| 5,014,573 | 5/1991 | Hunter et al. ....................... 477/155 X |
| 5,031,746 | 7/1991 | Koivumen . |
| 5,046,175 | 9/1991 | Lentz et al. . |
| 5,048,374 | 9/1991 | Miyake et al. ...................... 477/906 X |
| 5,058,460 | 10/1991 | Hibner et al. ....................... 477/155 X |

(List continued on next page.)

FOREIGN PATENT DOCUMENTS

| | | |
|---|---|---|
| 0 357 184 | 3/1990 | European Pat. Off. . |
| 0 372 073 | 6/1990 | European Pat. Off. . |
| 0 436 977 | 7/1991 | European Pat. Off. . |
| 0 626 529 | 11/1994 | European Pat. Off. . |
| 62-261747 | 11/1987 | Japan . |
| 1 224553 | 9/1989 | Japan . |
| 2 46358 | 2/1990 | Japan . |
| 1 475 423 | 6/1977 | United Kingdom . |
| 2 242 716 | 10/1991 | United Kingdom . |
| 2 273 321 | 6/1994 | United Kingdom . |

OTHER PUBLICATIONS

SAE 890528, Berthold Martin, et al., The Chrysler A-604 Ultradrive 4-Speed Automatic Transaxle, pp. 167–183.

SAE 890529, Maurice B. Leising, et al., "The All-Adaptive Controls for the Chrysler Ultradrive Transaxle", pp. 45–53.

*Primary Examiner*—Dirk Wright
*Assistant Examiner*—Peter T. Kwon
*Attorney, Agent, or Firm*—Oblon, Spivak, McClelland, Maier & Neustadt, P.C.

[57] ABSTRACT

A shift control system of an automatic transmission sets a predetermined gear stage by applying a first frictional engagement element and releasing a second frictional engagement element. A pressure regulating mechanism regulates an oil pressure to be fed to or drained from the first frictional engagement element. A failure detector detects a failure of an apparatus to participate in the regulation and control of the oil pressure which is to be fed to or drained from at least one of the first and second frictional engagement elements. A gear stage inhibitor inhibits the setting of the predetermined gear stage if the failure is detected by the failure detector.

7 Claims, 36 Drawing Sheets

U.S. PATENT DOCUMENTS

| | | |
|---|---|---|
| 5,070,747 | 12/1991 | Lentz et al. . |
| 5,072,390 | 12/1991 | Lentz et al. ............... 477/154 X |
| 5,076,117 | 12/1991 | Shibayama . |
| 5,079,970 | 1/1992 | Butts et al. . |
| 5,103,692 | 4/1992 | Shimanaka et al. . |
| 5,109,731 | 5/1992 | Iwatsuki et al. . |
| 5,113,343 | 5/1992 | Hunter et al. ............... 477/149 X |
| 5,129,287 | 7/1992 | Asada et al. . |
| 5,133,231 | 7/1992 | Goto et al. . |
| 5,165,308 | 11/1992 | Asada et al. . |
| 5,166,879 | 11/1992 | Greene et al. . |
| 5,209,141 | 5/1993 | Asayama et al. ............... 477/906 X |
| 5,288,279 | 2/1994 | Sakai et al. ............... 475/127 |
| 5,293,789 | 3/1994 | Goto et al. . |
| 5,295,415 | 3/1994 | Abe et al. . |
| 5,309,791 | 5/1994 | Takada et al. . |
| 5,334,114 | 8/1994 | Ando et al. ............... 475/119 |
| 5,411,451 | 5/1995 | Ando et al. ............... 477/154 X |
| 5,435,211 | 7/1995 | Matsumoto et al. ............... 192/3.58 X |
| 5,472,389 | 12/1995 | Ando et al. ............... 477/906 X |
| 5,505,674 | 4/1996 | Furukawa et al. ............... 477/906 X |
| 5,527,236 | 6/1996 | Kimura et al. ............... 477/156 X |
| 5,591,096 | 1/1997 | Wagner et al. ............... 475/119 |
| 5,634,869 | 6/1997 | Mikami et al. ............... 477/154 |
| 5,641,043 | 6/1997 | Niiyama ............... 192/3.63 |

| | $C_0$ | $C_1$ | $C_2$ | $B_0$ | $B_1$ | $B_2$ | $B_3$ | $B_4$ | $F_0$ | $F_1$ | $F_2$ |
|---|---|---|---|---|---|---|---|---|---|---|---|
| N | | | | ◌ | | | | | | | |
| REV. | | | ○ | ○ | | | | ○ | | | |
| 1ST | ○ | ○ | | | | | | ● | ○ | | ○ |
| 2ND | ● | ○ | | | | | ○ | | ○ | | |
| 3RD | ○ | ○ | | | ● | ○ | | | ○ | ○ | |
| 4TH | ○ | ○ | ○ | | | △ | | | ○ | | |
| 5TH | | ○ | ○ | ○ | | △ | | | | | |

FIG. 16

| TORQUE-DOWN $\theta$ | NORMAL | FLAGGED FOR INCREASE |
|---|---|---|
| $\theta_1$ | 10 (%) | 15 (%) |
| $\theta_2$ | 15 | 20 |
| $\theta_3$ | 20 | 30 |
| $\theta_4$ | 25 | 40 |
| $\theta_5$ | 30 | 45 |
| $\theta_6$ | 35 | 55 |
| $\theta_7$ | 40 | 60 |

SHIFT CONTROL SYSTEM FOR AUTOMATIC TRANSMISSION

This is a Division of application Ser. No. 08/253,301 filed on Jun. 3, 1994, now U.S. Pat. No. 5,665,027.

BACKGROUND OF THE INVENTION

The present invention relates to a system for controlling the shift of an automatic transmission and, more particularly, to a system for controlling an oil pressure for executing the shift.

As is well known in the art, an automatic transmission for vehicles is constructed to change power transmission paths in a gear train to execute a shift by applying/releasing frictional engagement means including clutches and brakes. Since the shifting operation is followed by rotational fluctuations of the rotary elements including the engine, the output shaft torque is abruptly changed to cause a shifting shock thereby to deteriorate the riding comfort, if the frictional engagement means is abruptly applied or released. In the case of the so-called "clutch-to-clutch shift", in which a predetermined frictional engagement means is released whereas another is applied, the engine will be either unloaded or overloaded to lower the output shaft torque and the durability of the frictional engagement means if the applying or releasing timing is improper.

In the prior art, the apply pressure of the frictional engagement means for absorbing the inertial energy accompanying the rotational fluctuations of the rotary elements is gradually augmented according to the characteristics of an accumulator by attaching this accumulator to the frictional engagement means.

If the oil pressure is fed to the frictional engagement means through the accumulator, it is possible to maintain the supply pressure at a low level till the packing clearance is filled up or to raise the apply pressure gently after the frictional engagement means has taken the torque capacity. Since, however, the accumulator having such actions has to be given a volume sufficient for containing considerably much oil, it is desired for reducing the size and weight of the hydraulic control system to control the apply pressure of the frictional engagement means directly by a pressure regulating valve in place of the accumulator.

In case the oil pressure is to be fed to a predetermined one of the frictional engagement means so as to execute the shift, it is necessary to perform continuous controls of a maintenance of the low-pressure state till the packing clearance is filled up, a relatively abrupt rise of the oil pressure till the start of an inertial phase, a gentle rise of the apply pressure after that, and a pressure rise after the end of the shift. In case these controls of the oil pressure are to be carried out by a mechanism including the pressure regulating valve, there are used a plurality of devices including not only the pressure regulating valve but also a solenoid valve for controlling the regulated pressure level or an electronic control unit. As a result, not only the degree of freedom in the pressure regulation but also the occurrence of failures become far more probable than those of the case in which the pressure is regulated only by the accumulator. If some device is failed, a high apply pressure is abruptly fed to the frictional engagement means, and the shifting shock may possibly deteriorate.

In the prior art, moreover, a one-way clutch is employed for smoothing the shift. At a gear stage to be set by applying the one-way clutch, the engine braking cannot become effective so that a multi-disc clutch or a multi-disc brake has to be arranged in parallel with the one-way clutch. If, therefore, the one-way clutch could be eliminated, the automatic transmission can have its size and weight reduced, but no control is required for effecting the engine braking. If, moreover, the one-way clutch is eliminated, the timings of applying/releasing the aforementioned two frictional engagement means have to be controlled by controlling the individual oil pressures to be fed to and released from the frictional engagement means. For this necessity, there is provided a hydraulic system which can control the oil pressures of those frictional engagement means independently of each other. Thus, the degree of freedom of the oil pressure control can be enhanced to provide a shift control suited better for the running state of the vehicle.

If, however, the two frictional engagement means participating in the shift could have their oil pressures controlled independently of each other, a more precise control could be obtained, as described above. Because of the independent control systems, on the contrary, the two frictional engagement means might be simultaneously fed with the oil pressure due to some failure or a dispersion of the quality of the control device. If such tie-up of the two frictional engagement means should take place, continue for a long time or occur frequently, the frictional engagement means might have durability degraded due to their individual excessive slips.

SUMMARY OF THE INVENTION

A main object of the present invention is to prevent frictional engagement means from having their durability degraded due to their excessive slips.

Another object of the present invention is to prevent the tie-up, in which the two frictional engagement means are applied so that the output torque temporarily drops, and to eliminate the shifting shock.

Still another object of the present invention is to prevent the tie-up at the time when the apply oil pressure of the frictional engagement means being shifted is insufficiently regulated, by regulating the apply oil pressure with a pressure regulating mechanism composed mainly of a valve without resorting to any accumulator.

Thus, the shift control system according to the present invention comprises means for detecting a failure of a pressure regulating mechanism or means for detecting a tie-up, so that a gear stage to be set by applying one of the frictional engagement means if the failure or tie-up of the pressure regulating mechanism is detected is inhibited. This makes it possible to prevent the tie-up which might otherwise be caused by an abnormal apply pressure of the frictional engagement means. The inhibition of the gear stage is executed in and out of execution of the shift. While the shift is being executed, the gear stage to be achieved by the shift is changed to prevent the tie-up temporarily, and the setting of the aforementioned gear stage is inhibited after the end of the shift.

The inhibition of the gear stage is to prevent the tie-up and the according deterioration of the durability of the frictional engagement means need not be effected in case the throttle opening is so small that the engine has a low output torque.

According to the present invention, moreover, the apply oil pressure of the frictional engagement means to cause the tie-up can be lowered to prevent the tie-up and the deterioration of the durability of the frictional engagement means.

The above and further objects and novel features of the present invention will more fully appear from the following detailed description when the same is read with reference to the accompanying drawings. It is to be expressly understood, however, that the drawings are for purpose of illustration only and are not intended as a definition of the limits of the invention.

BRIEF DESCRIPTION OF THE DRAWINGS

FIG. 16 is a table exemplifying a map of torque-down to be used for increasing the torque-down;

DETAILED DESCRIPTION OF THE PREFERRED EMBODIMENTS

Figure 1:
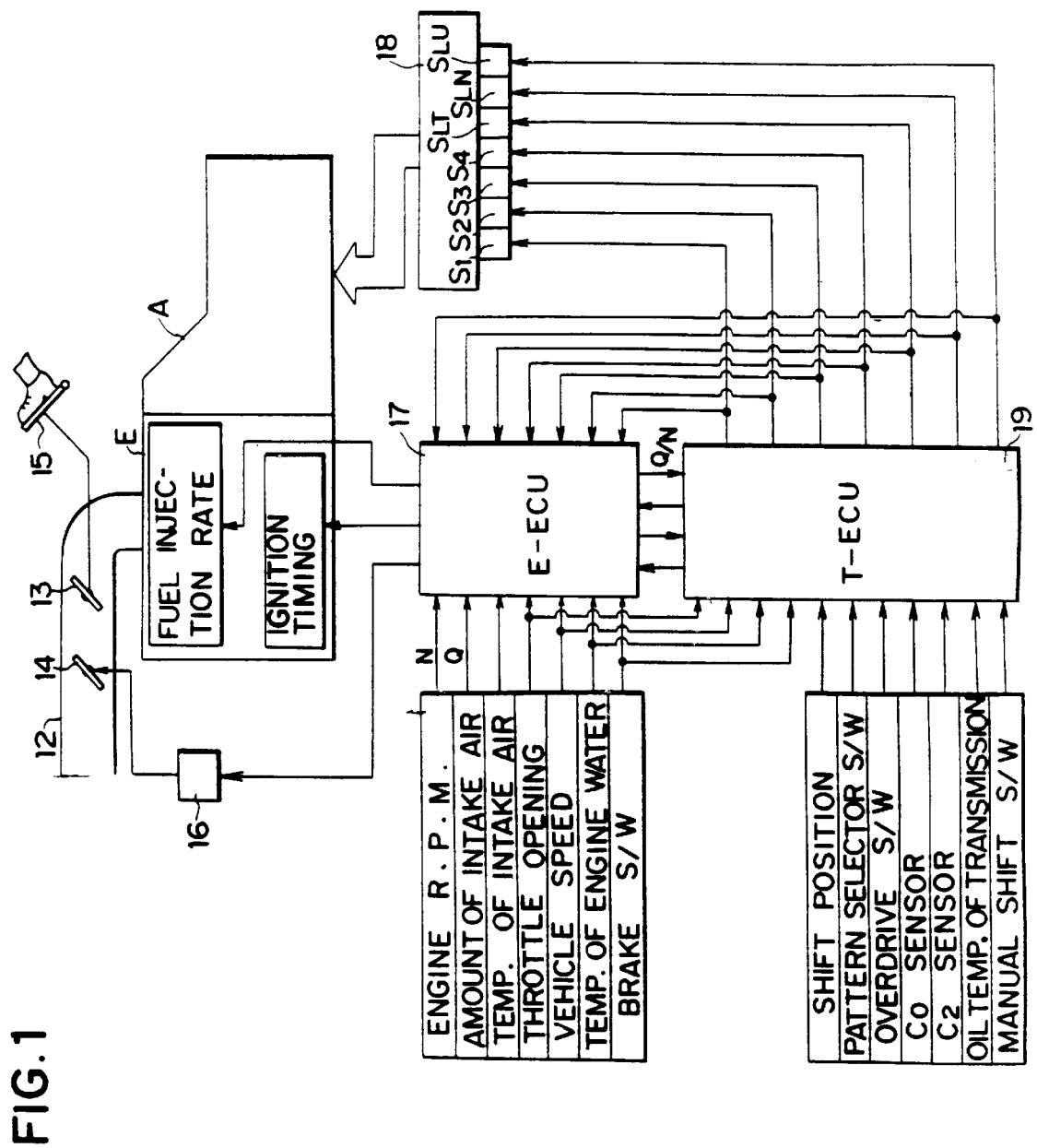
FIG. 1 is a block diagram schematically showing a control system according to one embodiment of the present invention.

The present invention will be described in the following in connection with its specific embodiments with reference to the accompanying drawings. In FIG. 1, an engine E connected to the automatic transmission A is equipped in its intake pipe 12 with a main throttle valve 13 and a sub-throttle valve 14 located upstream of the former. The main throttle valve 13 is so connected to an accelerator pedal 15 that it is controlled according to the depression of the accelerator pedal 15. On the other hand, the sub-throttle valve 14 is controlled by a motor 16. There is provided an engine electronic control unit (E-ECU) 17 for controlling the motor 16 to regulate the opening that sub-throttle valve 14 and for controlling the fuel injection rate and the ignition timing of the engine E. This electronic control unit 17 is composed mainly of a central processing unit (CPU), memory units (RAM and ROM) and an input/output interface and is fed as control data with a variety of signals including an engine (E/G) R.P.M. N, an amount Q of intake air, a temperature of intake air, a throttle opening, a vehicle speed, a temperature of engine cooling water and a brake switch.

In the automatic transmission A, a hydraulic control unit 18 controls the shift, a lockup clutch, a line pressure and/or an apply pressure of a predetermined frictional engagement means. The hydraulic control unit 18 is so constructed as to be electrically controlled and is equipped with: first to third shift solenoid valves S1 to S3 for executing the shift; a fourth solenoid valve S4 for controlling an engine braking state; a linear solenoid valve SLT for controlling the line pressure; a linear solenoid valve SLN for controlling an accumulator back pressure; and a linear solenoid valve SLU for controlling the apply pressure of the lockup clutch or a predetermined frictional engagement means.

There is further provided an automatic transmission electronic control unit (T-ECU) 19 for controlling the shift, the line pressure and/or the accumulator back pressure by outputting signals to those solenoid valves. This electronic control unit 19 is composed mainly of a central processing unit (CPU), memory units (RAM and ROM) and an input/output interface and is fed as the control data with the throttle opening, the vehicle speed, the engine cooling water temperature, the brake switch signal, a shift position signal, a pattern select switch signal, an overdrive switch signal, a signal coming from a C0 sensor for detecting the R.P.M. of a later-described clutch C0, a signal coming from a C2 sensor for detecting the R.P.M. of a later-described second clutch C2, an oil temperature of the automatic transmission and a signal of a manual shift switch.

Moreover, the automatic transmission electronic control unit 19 and the engine electronic control unit 17 are connected with each other for data communications. Specifically, signals such as a signal of an amount (Q/N) of intake air per revolution are sent from the engine electronic control unit 17 to the automatic transmission electronic control unit 19, whereas signals such as a signal equivalent to a command signal for each solenoid valve or a signal for commanding a gear stage are sent from the automatic transmission electronic control unit 19 to the engine electronic control unit 17.

More specifically, the automatic transmission electronic control unit 19 decides the gear stage, the ON/OFF of the lockup clutch, or the regulated pressure level of the line pressure or the apply pressure on the basis of the data inputted and the map stored in advance and outputs a command signal to a predetermined solenoid valve on the basis of the answer to decide a failure or perform a control based on the decision. On the other hand, the engine electronic control unit 17 not only controls the fuel injection rate, the ignition timing and/or the opening of the sub-throttle valve 14 on the basis of the data inputted but also lowers the output torque temporarily by reducing the fuel injection rate at the shifting time of the automatic transmission A, by changing the ignition timing and/or by throttling the opening of the sub-throttle valve 14.

Figure 2:
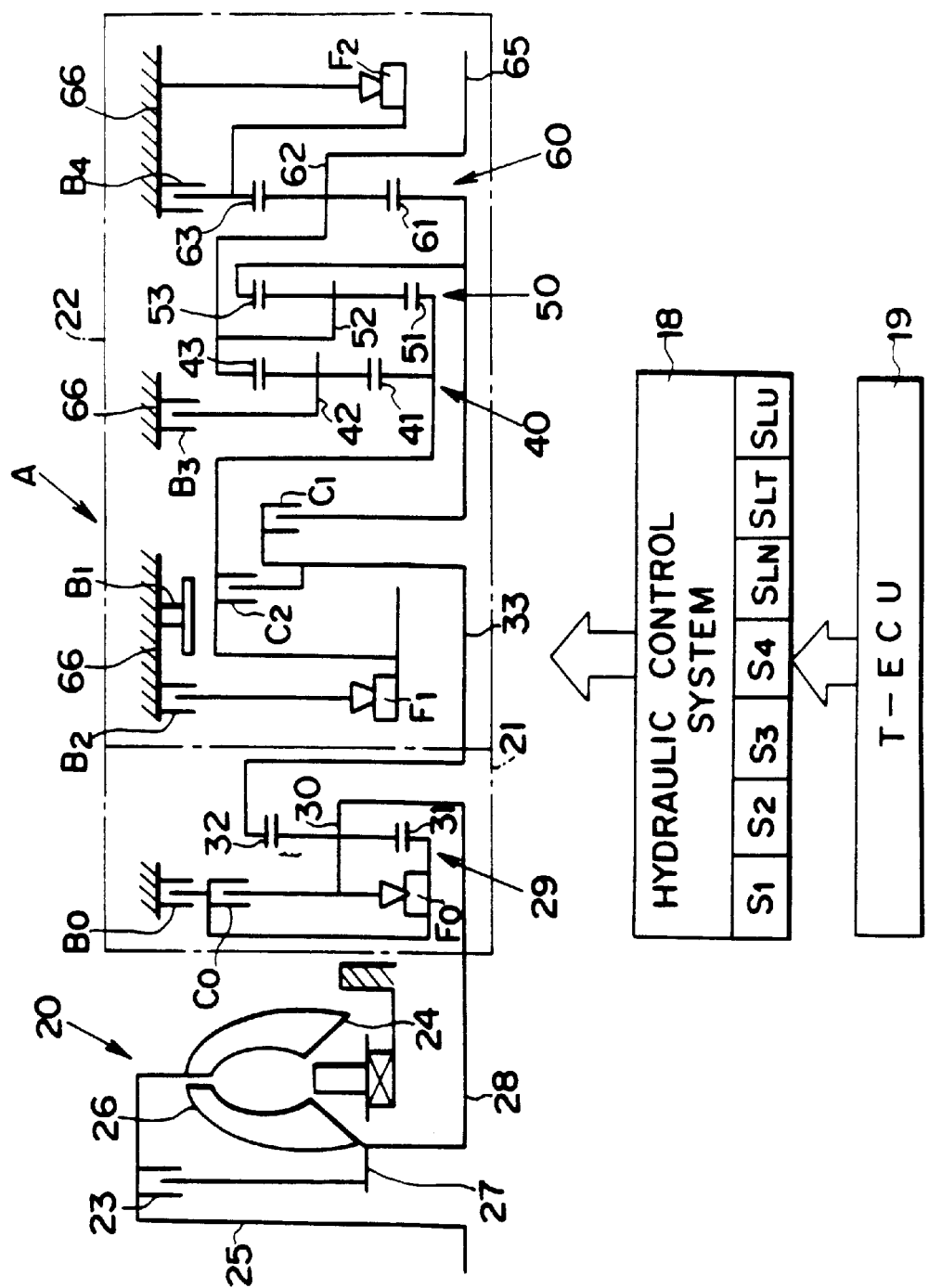
FIG. 2 is a diagram mainly showing a gear train of an automatic transmission for the control system.

FIG. 2 is a diagram showing one embodiment of the gear train of the automatic transmission A described above. As shown, the gear train is constructed to set five forward and one reverse gear stages. Specifically, the automatic transmission A is constructed of a torque converter 20, an auxiliary transmission unit 21 and a main transmission unit 22. The torque converter 20 is equipped with a lockup clutch 23 which is interposed between a front cover 25 integrated with a pump impeller 24 and a member (or hub) 27 integrated with a turbine runner 26. The engine has its crankshaft (although both are not shown) connected to the front cover 25, and an input shaft 28 having the turbine runner 26 connected thereto is connected to a carrier 30 of an overdrive planetary gear mechanism 28 constituting the auxiliary transmission unit 21.

Between the carrier 30 and a sun gear 31 of the planetary gear mechanism 29, there are interposed the multi-disc clutch C0 and a one-way clutch F0. Incidentally, this one-way clutch F0 is applied in case the sun gear 31 rotates forward (i.e., in the rotating direction of the input shaft 28) relative to the carrier 30. There is also provided a multi-disc brake B0 for braking the rotation of the sun gear 31 selectively. Moreover, a ring gear 32 acting as the output element of the auxiliary transmission unit 21 is connected to an intermediate shaft 33 acting as the input element of the main transmission unit 22.

In the auxiliary transmission unit 21, therefore, the planetary gear mechanism 29 rotates as a whole with the multi-disc clutch C0 or the one-way clutch F0 being applied, so that the intermediate shaft 33 rotates at the same speed as that of the input shaft 28, thus establishing a lower gear stage. With the brake B0 being applied to stop the rotation of the sun gear 31, moreover, the ring gear 32 is accelerated with respect to the input shaft 28 to establish a higher speed gear stage.

On the other hand, the main transmission unit 22 is equipped with three sets of planetary gear mechanisms 40, 50 and 60, which have their individual rotary elements connected, as follows. Specifically, a sun gear 41 of the first planetary mechanism 40 and a sun gear 51 of the second planetary mechanism 50 are integrally connected to each other. Moreover, a ring gear 43 of the first planetary mechanism 40, a carrier 52 of the second planetary mechanism 50 and a carrier 62 of the third planetary mechanism 60 are connected to one another, and an output shaft 65 is connected to the carrier 62 of the third planetary mechanism 60. In addition, the second planetary mechanism 50 has its ring gear 53 connected to a sun gear 61 of the third planetary mechanism 60.

The gear train of this main transmission unit 22 can set one reverse and four forward gear stages and is composed of the following clutches and brakes for that settings. Of these, the clutches will be described at first. A first clutch C1 is interposed between a ring gear 53 of the second planetary mechanism 50 and the sun gear 61 of the third planetary mechanism 60, which are connected to each other, and the intermediate shaft 33. Moreover, the second clutch C2 is interposed between the sun gear 41 of the first planetary mechanism 40 and the sun gear 51 of the second planetary mechanism 50, which are connected to each other, and the intermediate shaft 33.

Here will be described the brakes. A first brake B1 is a band brake which is arranged to stop the rotations of the sun gears 41 and 51 of the first and second planetary mechanisms 40 and 50. Between these sun gears 41 and 51 (i.e., the common sun gear shaft) and a casing 66, there are arrayed in series a first one-way clutch F1 and a second brake B2 which is a multi-disc brake. Of these, the first one-way clutch F1 is applied when the sun gears 41 and 51 are to rotate backward (of the opposite rotating direction of the input shaft 28). A third brake B3 or a multi-disc brake is interposed between a carrier 42 of the first planetary mechanism 40 and the casing 66. Between a ring gear 63 of the third planetary mechanism 60 and the casing 66, there are arranged in parallel a fourth brake B4 which is a multi-disc brake for braking the rotation of the ring gear 63 and a second one-way clutch F2. Incidentally, this second one-way clutch F2 is applied when the ring gear 63 is to rotate backward.

Figures 3, 4:
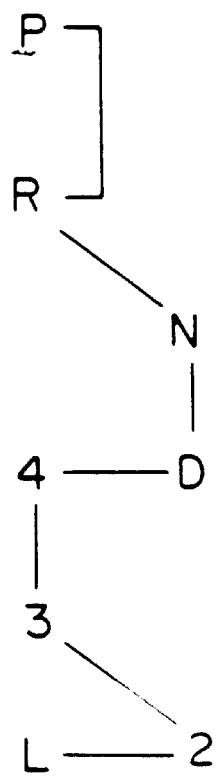
FIG. 3 is a clutch/brake application chart for setting individual gear stages.
FIG. 4 is a diagram showing an array of shift positions for selecting individual running ranges.

The automatic transmission A thus far described can set five forward and one reverse gear stages by applying/releasing the individual clutches and brakes, as tabulated in the clutch/brake application chart of FIG. 3. In FIG. 3: symbols ○ indicate the applied state; symbols ● indicate the applied state to be taken at the time of engine braking; symbols Δ indicate the applied or released state; and blanks indicate the released state.

The individual gear stages appearing in FIG. 3 are set according to the running ranges which are selected by operating the (not-shown) shift lever, and the positions of those running ranges to be selected by the shift lever are arrayed, as shown in FIG. 4. Specifically, the array is made such that a parking (P) range position is followed by a reverse (R) range position and such that a neutral (N) range position is arranged subsequent to the R-range but oblique to the array of the P-range and the R-range. A drive (D) range position is arranged subsequent to the N-range in parallel with the aforementioned array direction of the P-range position and the R-range position. Moreover, a 4th speed range position is subsequently arranged at a right angle with respect to the array direction of the N-range and the D-range. In addition, a 3rd speed range position is arranged subsequent to the 4th speed range position in parallel with the aforementioned array direction of the N-range and the D-range. Moreover, a 2nd speed range position is arranged to have a relation similar to that which is taken by the N-range relative to the aforementioned R-range position. Finally, a low (L) range position is arranged to have a relation similar to that which is taken by the 4th speed range position relative to the D-range position.

Of these running ranges: the D-range can establish the five forward gear stages shown in FIG. 3; the 4th speed range can establish the four forward gear stages excepting the 5th speed or the overdrive gear stage; the 3rd speed range can establish the gear stages to the 3rd speed; the 2nd speed range can establish the gear stages to the 2nd speed; and the L-range can establish only the first speed. In case, therefore, the shift lever is manually operated between the 3rd speed range position and the 2nd speed range position, there is established either an upshift from the 2nd speed to the 3rd speed or a downshift from the 3rd speed to the 2nd speed.

As tabulated in the clutch/brake application chart of FIG. 3, the shifts between the 2nd speed and the 3rd speed are effected by the clutch-to-clutch shifts in which both the application and release of the second brake B2 and the third brake B3 are changed together. In order to control the oil pressures of those brakes B2 and B3 independently of each other thereby to smoothen these shifts, a hydraulic circuit shown in FIG. 5 is incorporated into the aforementioned hydraulic control unit 18.

Figure 5:
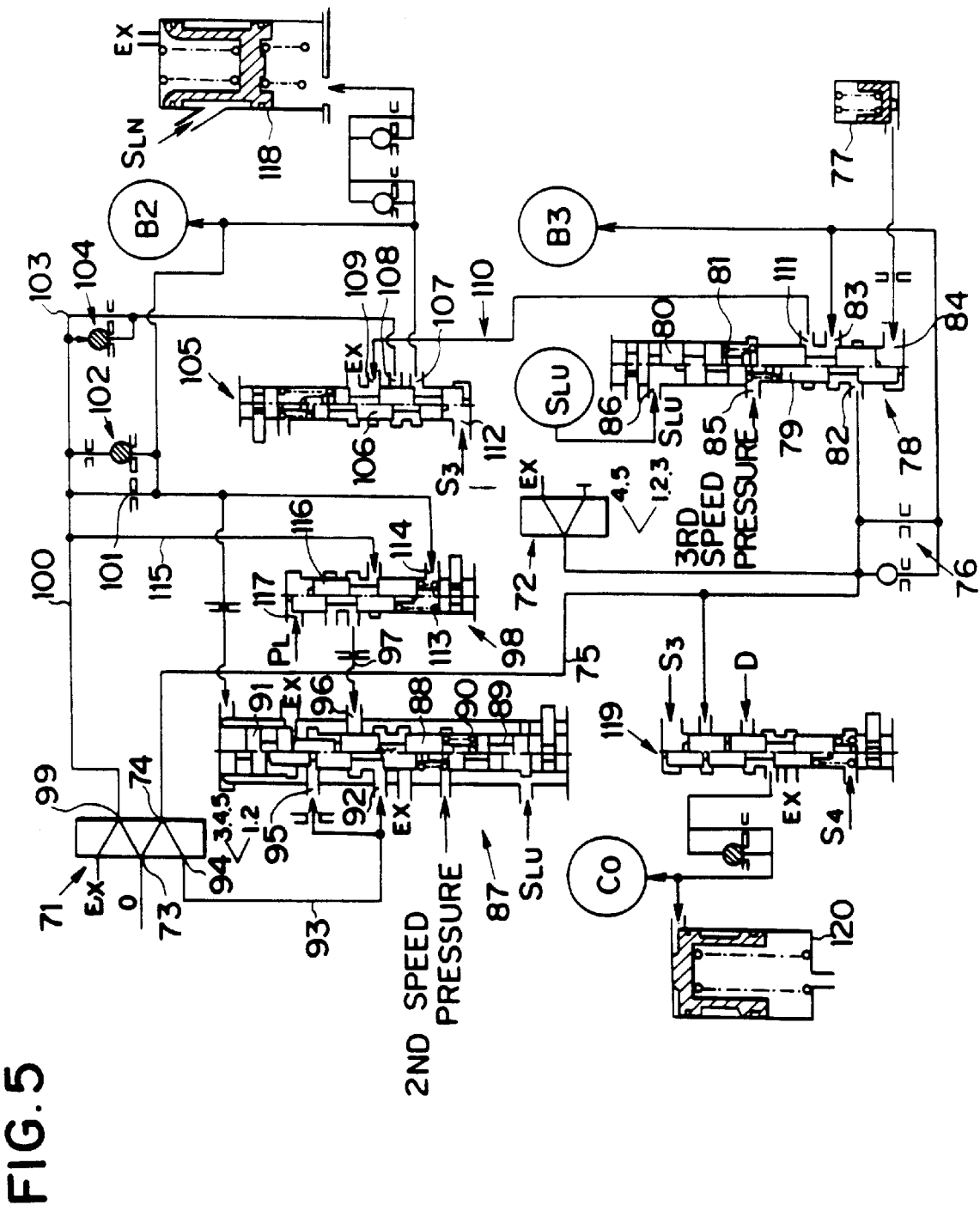
FIG. 5 is a diagram showing a portion of an oil pressure circuit.

In FIG. 5, numeral 71 designates a 2–3 shift valve, and numeral 72 designates a 3–4 shift valve for switching in response to a signal pressure coming from the (not-shown) solenoid valve. These shift valves 71 and 72 have their individual ports opened to have communications at the individual gear stages, as respectively enumerated below themselves. Incidentally, the numerals indicate the individual gear stages. Of the ports of the 2–3 shift valve 71, a brake port 74 to communicate with an input port 73 at the 1st and 2nd speeds is connected to the third brake B3 via an oil passage 75. This oil passage 75 is equipped with an orifice 76, and a damper valve 77 is connected between the orifice 76 and the third brake B3. The damper valve 77 sucks the oil pressure a little to perform its damping action in case the third brake B3 is abruptly fed with the line pressure.

Reference numeral 78 designates a B3 control valve for controlling the apply pressure of the third brake B3 directly. Specifically, the B3 control valve 78 is equipped with a spool 79, a plunger 80 and a spring 81 sandwiched between the former two. An input port 82 to be controlled by the spool 79 is connected to the oil passage 75, and an output port 83 to be selectively caused to communicate with the input port 82 is connected to the third brake B3. The output port 3 is further connected to a feedback port 84 which is formed at the side of the leading end of the spool 79. On the other hand, a port 85 opened into a portion, in which is arranged the aforementioned spring 81, is connected with a (not-shown) oil passage for feeding a D-range pressure from the 2–3 shift valve 71 at a 3rd or higher speed gear stage. Moreover, a control port 86 formed at the side of the end portion of the plunger 80 is connected with the lockup clutch linear solenoid valve SLU.

As a result, the B3 control valve 78 has its regulated pressure level set by the elastic force of the spring 81 and the oil pressure fed to the port 86, and the regulated pressure level can be changed by the signal pressure to be fed to the control port 86, in case the total pressure of the signal pressure exceeds the elastic force of the spring 81. At a 3rd or higher speed gear stage, moreover, the spool 79 is fixed in the position, as shown at the lefthand half of FIG. 5, by the D-range pressure fed to the port 85.

In addition, reference numeral 87 appearing in FIG. 5 designates a 2–3 timing valve which is constructed to include: a spool 88 formed with one radially smaller land and two radially larger lands; a first plunger 89; a spring 90 sandwiched between the former two; and a second plunger 91 arranged at the side opposed to the first plunger 89 across the spool 88. This 2–3 timing valve 87 has its intermediate port 92 connected to an oil passage 93. This oil passage 93 is connected to such a port 94 of the 2–3 shift valve 71 as is caused to communicate with the brake port 74 at a 3rd or higher speed gear stage, so that it is fed with the drain pressure of the third brake B3. Moreover, the oil passage 93 is branched in its midway and connected through an orifice to a port 95 which is opened between the aforementioned smaller-diameter land and one of the larger-diameter lands. In other words, the oil passage 93 regulates the drain pressure of the third brake B3. A port 96 to be selectively caused to communicate with the port 92 at the intermediate portion is connected through an oil passage 97 with a solenoid relay valve 98. That port 96 is fed with the supply pressure of the second brake B2 when the 3rd speed is to be set. At a shift from the 2nd to 3rd speeds, therefore, the oil pressure is fed to the third brake B3 via the port 96 while being regulated by the 2–3 timing valve 87 and drained. Moreover, the lockup clutch linear solenoid valve SLU is connected to the port which is opened in the end portion of the first plunger 89, thereby to change the regulated pressure level. And the second brake B2 is connected through an orifice to the port which is opened in the end portion of the second plunger 91.

To such a port 99 of the 2–3 shift valve 71 as is caused to communicate with the input port 73 at a 3rd or higher speed gear stage, there is connected an oil passage 100, which in turn is connected to the second brake B2. This oil passage 100 is equipped with a smaller-diameter orifice 101 and an orifice 102 having a check ball in parallel with each other. From this oil passage 100, there is branched an oil passage 103 which is equipped with a larger-diameter orifice 104 having a check ball to be opened when the second brake B2 is to be released. The oil passage 103 is connected with an orifice control valve 105, as will be described in the following.

This orifice control valve 105 controls a rate of releasing the pressure from the second brake B2. This second brake B2 is connected to a port 107 which is so formed at the lower end of FIG. 5 as can be opened or closed by a spool 106 of the orifice control valve 105. The aforementioned oil passage 103 is connected to a port 108 which is formed below that port 107, as shown. A port 109 is formed above the port 107 connected with the second brake B2, as shown, and is selectively caused to communicate with a drain port. To that port 109, there is connected through an oil passage 110 a port 111 of the aforementioned B3 control valve 78. Incidentally, this port 111 is selectively caused to communicate to the output port 83 which is connected with the third brake B3.

The reason why the drain pressure of the B3 control valve 78 is drained through the orifice control valve 105 is to improve the pressure regulating accuracy of the B3 control valve 78. For example, this B3 control valve 78 regulates the pressure from 0 to 8 Kgf/cm$^2$, and a higher oil pressure is realized by closing the port 109 of the orifice control valve 105 and by quitting the pressure regulating action of the B3 control valve 78.

The signal pressure of the third solenoid valve S3 of the normally closed type is selectively fed to such a control port of the orifice control valve 105 as is formed at the end portion opposed to the spring for pushing the spool 106.

Incidentally, the aforementioned B3 apply valve 98 establishes the communication of the oil passage for feeding the oil pressure from the 2–3 shift valve 71 to the second brake B2, selectively with the oil passage 97. An oil passage 115 branched from the oil passage 100 is connected with a port 114 which is opened in the arranged position of a spring 113, and a line pressure PL is fed to a port 117 which is located at the opposite side across a spool 116.

In FIG. 5, moreover: reference numeral 118 designates an accumulator for the second brake B2; numeral 119 designates a C0 exhaust valve; and numeral 120 designates an accumulator for the clutch C0. Incidentally, the C0 exhaust valve 119 applies the clutch C0 so as to effect the engine braking at the 2nd speed.

According to the hydraulic circuit thus far described, therefore, if the port 111 of the B3 control valve 78 is in communication with the drain, the apply pressure to be fed to the third brake B3 at the time of setting the 2nd speed can be directly regulated by the B3 control valve 78, and its regulated level can be varied by the linear solenoid valve SLU. If, on the other hand, the spool 106 of the orifice control valve 105 is in the position, as shown at the lefthand half in FIG. 5, the second brake B2 has communication with the oil passage 103 through that orifice control valve 105. As a result, the pressure can be released through the larger-diameter orifice 104 to control the rate of releasing the pressure from the second brake B2.

Specifically, the third brake B3 is applied in the case of an upshift from the 1st to 2nd speeds or a downshift from the 3rd to 2nd speeds. The oil pressure to be applied to the third brake B3 is generally controlled in the following manner, although it is slightly different between the upshift and the downshift.

As described above, the B3 control valve 78 performs its pressure regulating action when its port 111 is in communication with the drain, and the line pressure is fed as it is to the third brake B3 when its spool 79 is fixed in the position, as shown at the lefthand half of FIG. 5. Therefore, the third solenoid valve S3 is turned OFF to feed the oil pressure to the control port 112 of the orifice control valve 105 for a predetermined time period immediately after a shift signal to the 2nd speed has been outputted, for example. As a result, the orifice control valve 105 has its port 109 closed by its spool 106 so that the port 111 of the B3 control valve 78 is substantially closed. In addition, the signal pressure is fed from the linear solenoid valve SLU for the lockup clutch to the control port 86 of the B3 control valve 78 to push down the spool 79 to the position, as shown at the lefthand half of FIG. 5. Thus, a fast application can be achieved by feeding the line pressure to the third brake B3.

In the case of a low-pressure standby, on the contrary, the third solenoid valve S3 is turned ON to release the pressure from the control port 112 of the orifice control valve 105 thereby to cause the port 109 of the same to communicate with the drain port. Thus, the B3 control valve 78 has its port 111 drained so that the signal pressure to be outputted from the linear solenoid valve SLU is set to such a low level that its total pressure (i.e., a load for pushing the plunger 80) is lower than the elastic force of the spring 81. As a result, the regulated pressure level of the B3 control valve 78 is a low value determined by the elastic force of the spring 81 so that the oil pressure to be fed to the third brake B3 is held at a low level.

At a stage (in a torque phase) on and before the inertial phase, the B3 control valve 78 has its regulated pressure level raised if the signal pressure from the linear solenoid valve SLU is set to a rather high level, so that the rising rate of the apply pressure of the third brake B3 increases. If the start of the inertial phase is detected, the signal pressure to be fed to the control port 86 of the B3 control valve 78 is set to a level slightly lower than the preceding one. As a result, the B3 control valve 78 has its regulated pressure level lowered to gentle the rising rate of the third brake B3 so that the shifting shock can be improved.

After the end of the shift, the third solenoid valve S3 is turned OFF to close the port 109 of the orifice control valve 105 so that the B3 control valve 78 may not perform the pressure regulating action. Thus, the line pressure is fed as it is to the third brake B3 to apply it without fail.

As described above, the B3 control valve 78, the linear solenoid valve SLU, the orifice control valve 105, the third solenoid valve S3, and the electronic control unit 19 for controlling those solenoid valves SLU and S3 participate as a pressure regulating mechanism in the direct control of the apply pressure of the third brake B3. If any of these participants is failed, the apply pressure of the third brake B3 cannot be controlled, as expected. In this abnormal case, the following controls are carried out in the shift control system thus constructed according to the present invention.

Figure 6:
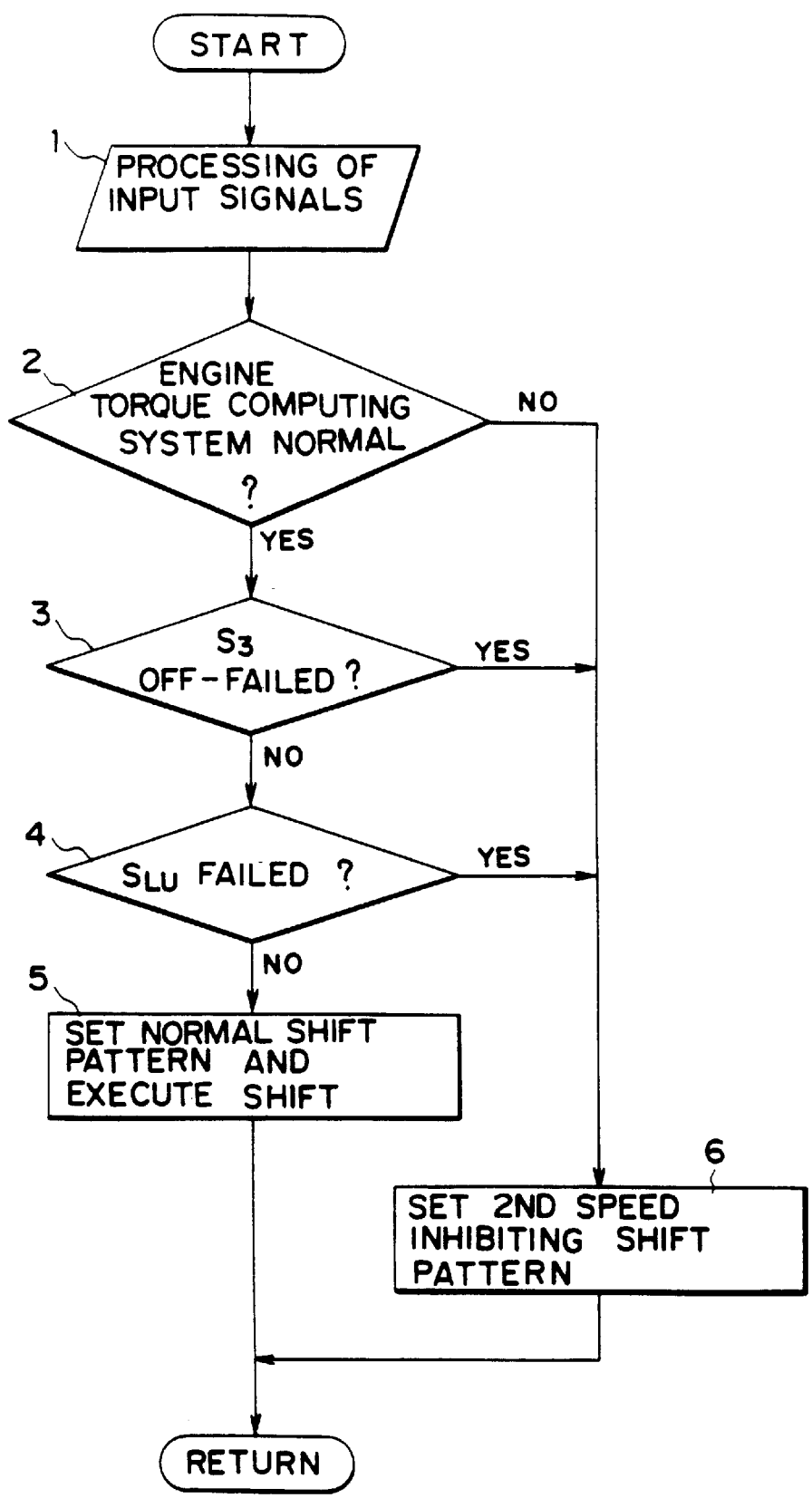
FIG. 6 is a flow chart showing a control routine for inhibiting a 2nd speed at the time of a failure.
Figure 7:
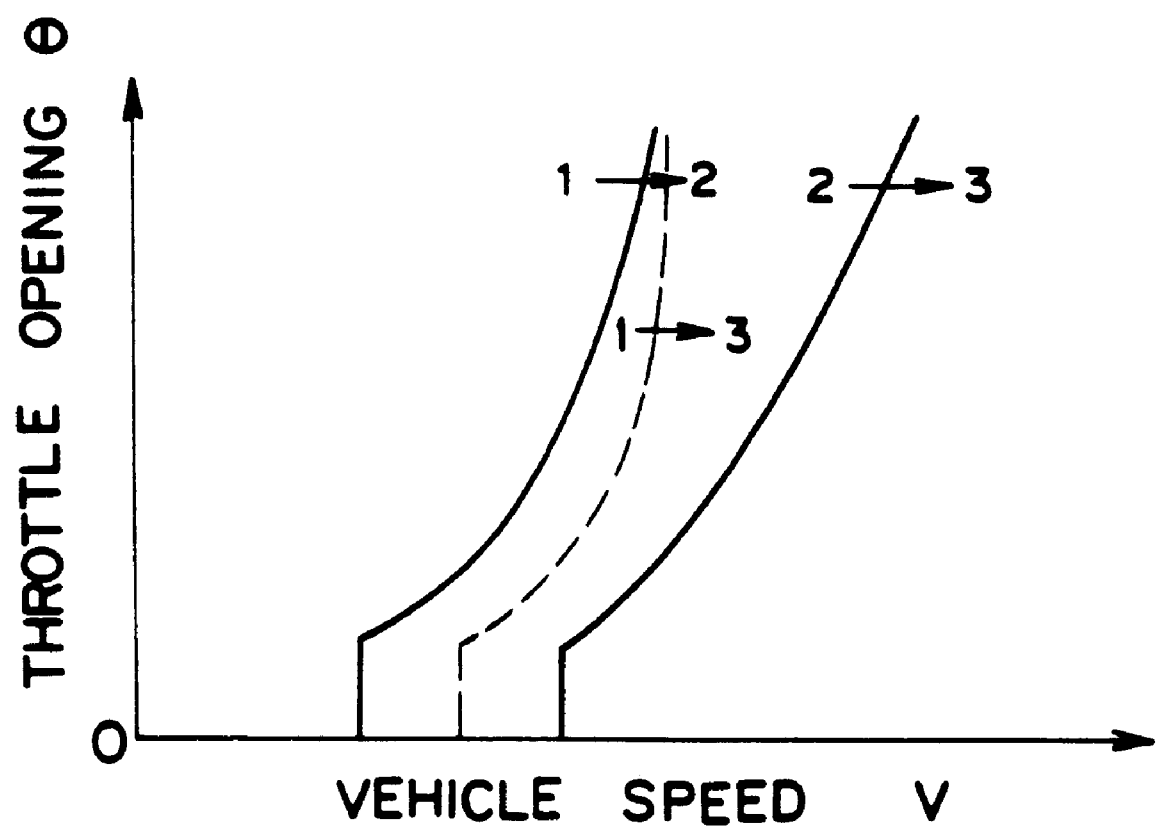
FIG. 7 is a conceptional diagram illustrating one example a shift diagram to be used for inhibiting the 2nd speed.

FIG. 6 is a flow chart showing a control routine in case either the solenoid valve SLU or S3 is failed. First of all, the input signals are processed (at Step 1). It is then decided (at Step 2) whether or not the control system for computing the engine torque is normal. If the answer is "NO", it is decided (at Step 3) whether or not the third solenoid valve S3 is OFF-failed (i.e., failed while being OFF) and then (at Step 4) whether or not the linear solenoid valve SLU is failed. In short, the controls of Steps 3 and 4 belong to the function of failure detecting means. If neither the solenoid valve SLU nor S3 is failed, the routine advances to Step 5, at which a normal shift pattern (or shift diagram) is set so that the shift is executed according to the shift pattern. On the contrary, if either the solenoid valve SLU or S3 is failed, that is, if the answer of Step 3 or 4 is "YES", the routine advances to Step 6, at which a 2nd speed inhibiting shift pattern (or shift diagram) is set. If, moreover, the answer of Step 2 is "YES", the routine also advances to Step 6, at which the 2nd speed inhibiting shift pattern (or shift diagram) is set. In short, the control of Step 6 belongs to the function of gear stage inhibiting means. Specifically, as shown in FIG. 7, in a region of a normal shift diagram between a 1st→2nd upshift curve and a 2nd→3rd upshift curve, there is newly set a shift diagram having a 1st→3rd upshift curve in place of those upshift curves, and the shift is executed on the basis of the newly set shift diagram. Thus, the third brake B3, which cannot have its apply pressure substantially controlled, is left disengaged, to prevent the tie-up, in which both the second brake B2 and the third brake B3 are applied, so that these frictional engagement means can be prevented from having their durability degraded. Moreover, the third brake B3 is not controlled by the uncontrollable B3 control valve 78 so that the shifting shock does not deteriorate.

Here, the aforementioned shift control system is equipped with the linear solenoid valve SLT for controlling the line pressure PL, as shown in FIG. 1. This linear solenoid valve SLT controls the line pressure PL in accordance with the throttle opening such that its control can be made arbitrary to some extent in response to the command signal coming from the electronic control unit 19. In case, therefore, the apply pressure of the third brake B3 cannot be regulated, that control may be utilized to prevent the tie-up or the accompanying shifting shock.

Figure 8:
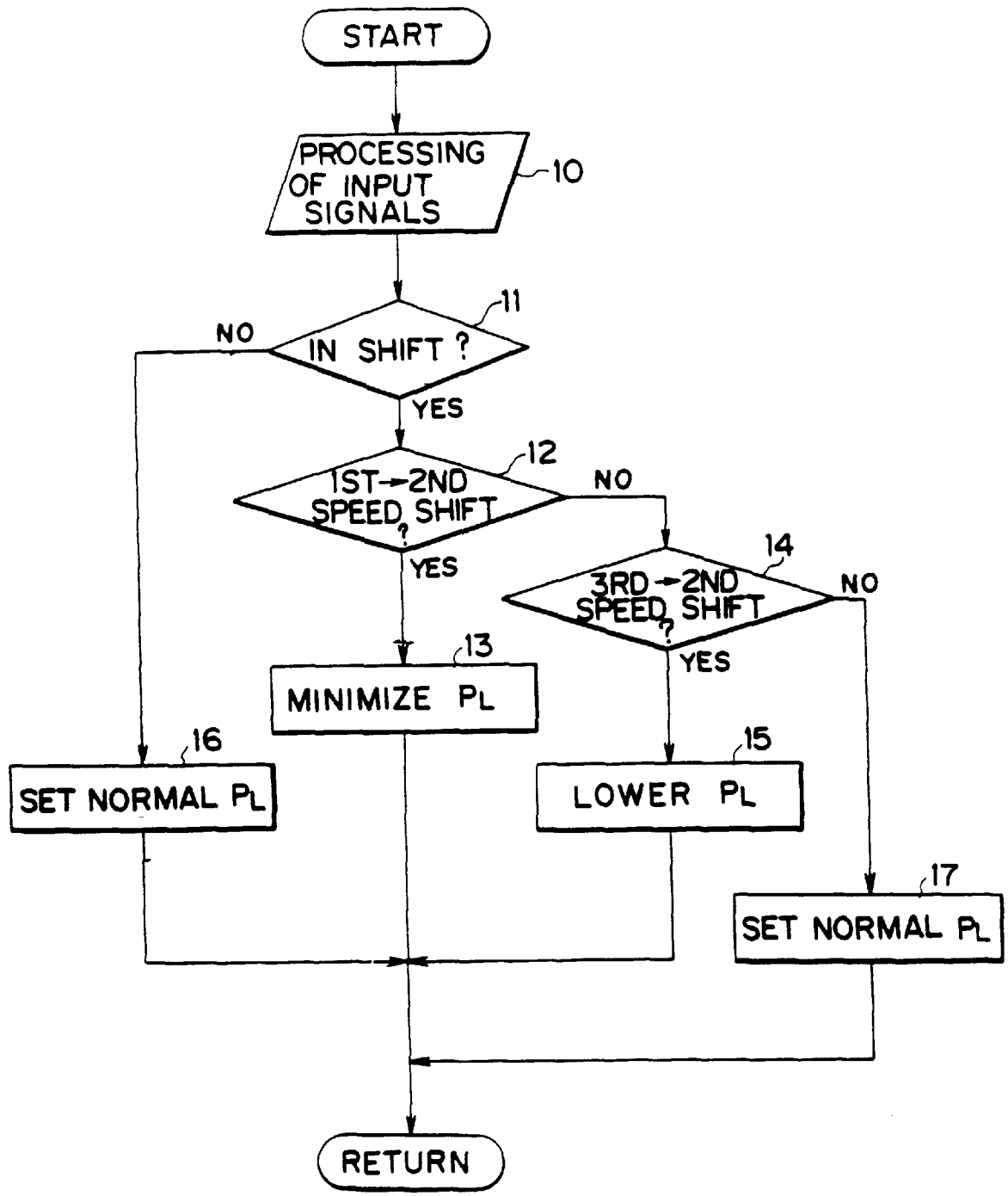
FIG. 8 is a flow chart showing a control routine for lowering a line pressure at the time of shifting to the 2nd speed.

FIG. 8 is a flow chart showing a control routine. After a processing of input signals (at Step 10), it is decided (at Step 11) whether or not the vehicle is in a shifting operation. If the answer is "YES", it is decided (at Step 12) whether or not the shift is from the 1st to 2nd speeds. If the answer is also "YES", the line pressure PL is minimized (at Step 13) within a range for shifting the 2nd speed. This control of Step 13 is a function of original pressure lowering means. For the 2nd speed, more specifically, the third brake B3 and the first clutch C1 are applied, as tabulated in the clutch/brake application chart of FIG. 3, and the line pressure PL is minimized within a range in which the first clutch C1 has a torque capacity. Since the oil pressure to be fed to the third brake B3 cannot be regulated by the B3 control valve 78, the original pressure of the apply pressure of the third brake B3, i.e., the line pressure PL itself is suppressed to a low level even if that apply pressure abruptly arises, so that the oil pressure to be fed to the third brake B3 is lowered to prevent the shifting shock.

If the answer of Step 12 is "NO", on the other hand, the routine advances to Step 14, at which it is decided whether or not the shift is from the 3rd to 2nd speeds. If this answer is "YES", the line pressure PL is lowered at Step 15 as at Step 13. In this case, too, the tie-up and the accompanying shifting shock are prevented because the original pressure is low, even if the apply pressure of the third brake B3 cannot be regulated.

Incidentally, if the answer of Step 11 is "NO" because the vehicle is not being shifted, the routine advances to Step 16, at which the normal line pressure is set. If the answer of Step 14 is "NO" because the vehicle is not being shifted from the 3rd to 2nd speeds, the routine advances to Step 17, at which the normal line pressure PL is set.

In case the third brake B3 is applied from its released state, the supply pressure is kept at a low level, and the apply pressure is then gradually raised, till the end of the operation in which the hydraulic servo mechanism has its oil chamber (although both are not shown) filled up with the oil and in which the (not-shown) piston is moved to fill up the so-called "packing clearance". This is to prevent the apply pressure from surging. If the apply pressure of the third brake B3 cannot be regulated, it is necessary to prevent the oil pressure from rising at this low-pressure standby time.

Figure 9:
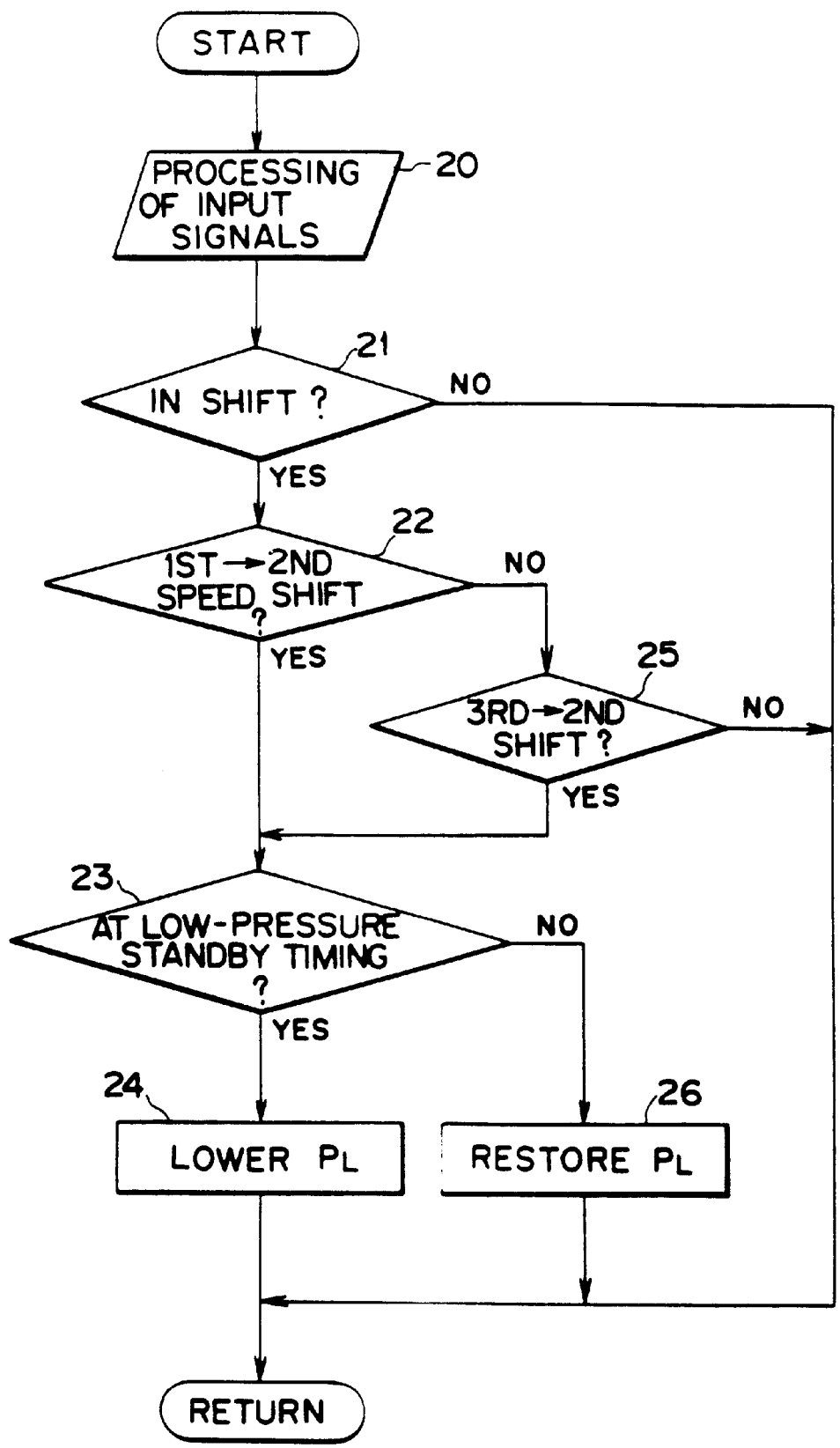
FIG. 9 is a flow chart showing a control routine for lowering the line pressure at a low-pressure standby timing at the time of shifting to the 2nd speed.

In the control, as shown by the flow chart of FIG. 9, the apply pressure of the third brake B3 at the low-pressure standby time is lowered. Specifically, after processing of the input signals (at Step 20), it is decided (at Step 21) whether or not the vehicle is being shifted. If the answer is "NO", the routine is returned without any control. If the answer is "YES", it is decided (at Step 22) whether or not the shift is from the 1st to 2nd speeds. If the answer of this decision is "YES", it is decided (at Step 23) whether or not the timing is at the low-pressure standby. If so, the line pressure PL is lowered (at Step 24). As a result, if the apply pressure of the third brake B3 cannot be regulated through the aforementioned B3 control valve 78, the oil pressure to be fed at the low-pressure standby time is suppressed to a low level because the line pressure PL or the original pressure is low. As a result it is possible to prevent the apply pressure from surging and the accompanying shifting shock from getting worse.

If the answer of Step 22 is "NO", the routine advances to Step 25, at which it is decided whether or not the shift is from the 3rd to 2nd speeds. If the shift is from the 3rd to 2nd speeds and if the timing is at the low-pressure standby (that is, both the answers of Steps 25 and 23 are "YES"), the line pressure PL is lowered (at Step 24) like before. Incidentally, if the answer of Step 25 is "NO", the routine is returned.

On the other hand, unless the timing is at the low-pressure standby even if the shift is either from the 1st to 2nd speeds or from the 3rd to 2nd speed, that is, if the answer of Step 23 is "NO", the routine advances to Step 26, at which the line pressure PL is not lowered but restored.

Here will be described another embodiment of the present invention. In the embodiment shown in FIG. 10, the aforementioned damper valve 77 is not employed but replaced by the accumulator 120 for the clutch C0, which is also used as a damper for the third brake B3. In this accumulator 120, a piston 121 is formed at its leading end side with a first oil chamber 122 connected with the clutch C0 and around its outer circumference with a second oil chamber 123 which has a pressure receiving area larger at the side of the first oil chamber 122 than at the opposite side, and a back pressure chamber 125 accommodating a spring 124 is fed with an accumulator control pressure PACC (or the line pressure). Moreover, the second oil chamber 123 is connected with the third brake B3.

Figure 10:
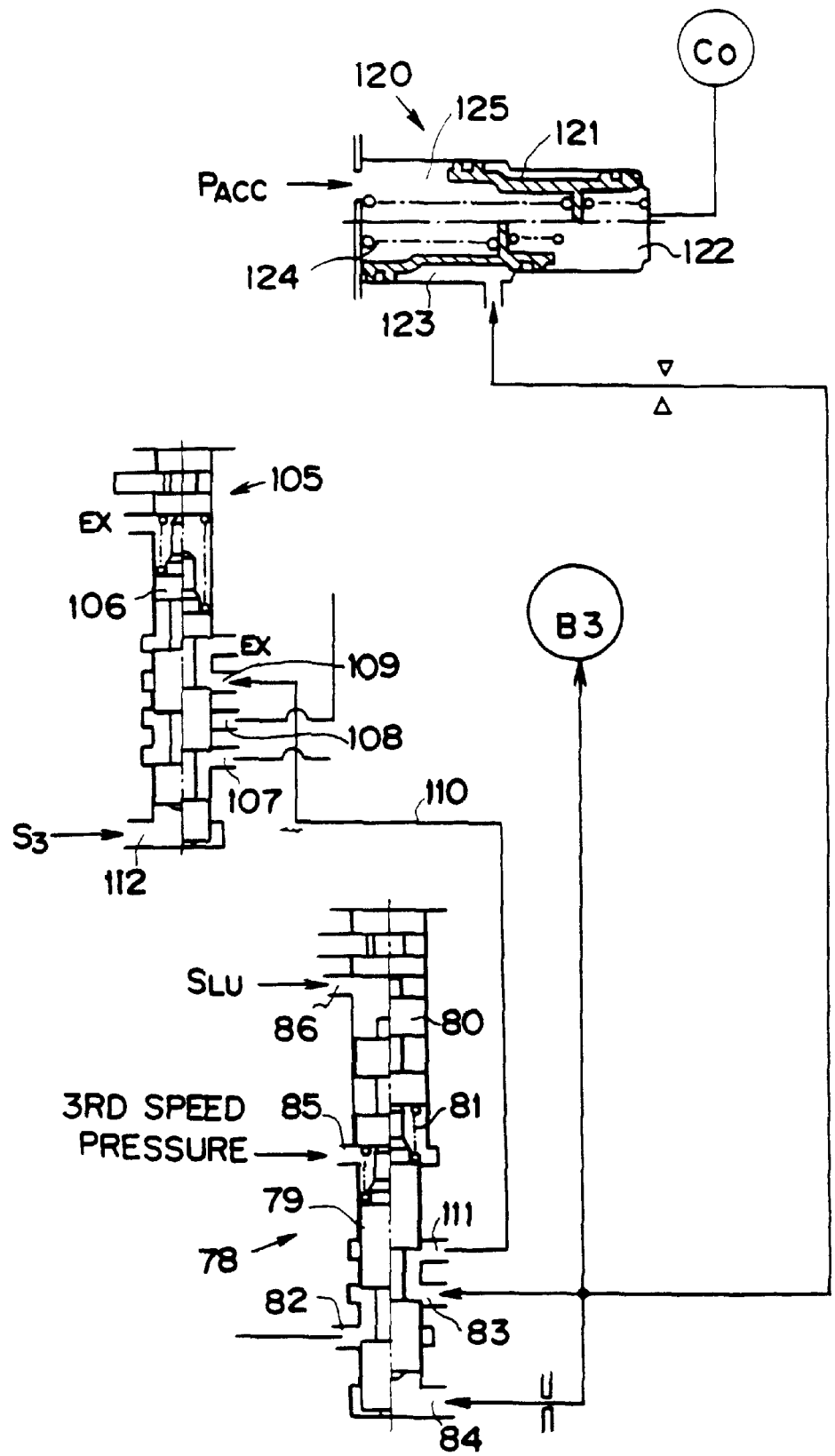
FIG. 10 is a diagram showing a portion of an oil pressure circuit in another embodiment of the present invention.

With the construction shown in FIG. 10, therefore, a high oil pressure acts, if abruptly applied to the third brake B3, upon the second oil chamber 123 of the accumulator 120 so that the piston 121 is moved leftward of FIG. 10. As a result, the oil pressure fed to the third brake B3 is partially absorbed by the second oil chamber 123 so that its rise in the third brake B3 is damped. Moreover, the higher oil pressure is damped for the higher engine load because the accumulator 120 is fed at its back pressure chamber 125 with the accumulator control pressure PACC. In the construction shown in FIG. 10, still moreover, the accumulator 120 is shared between the clutch C0 and the third brake B3. As a result, the number of parts can be reduced to reduce the size and weight of and the cost for the system.

Figure 11:
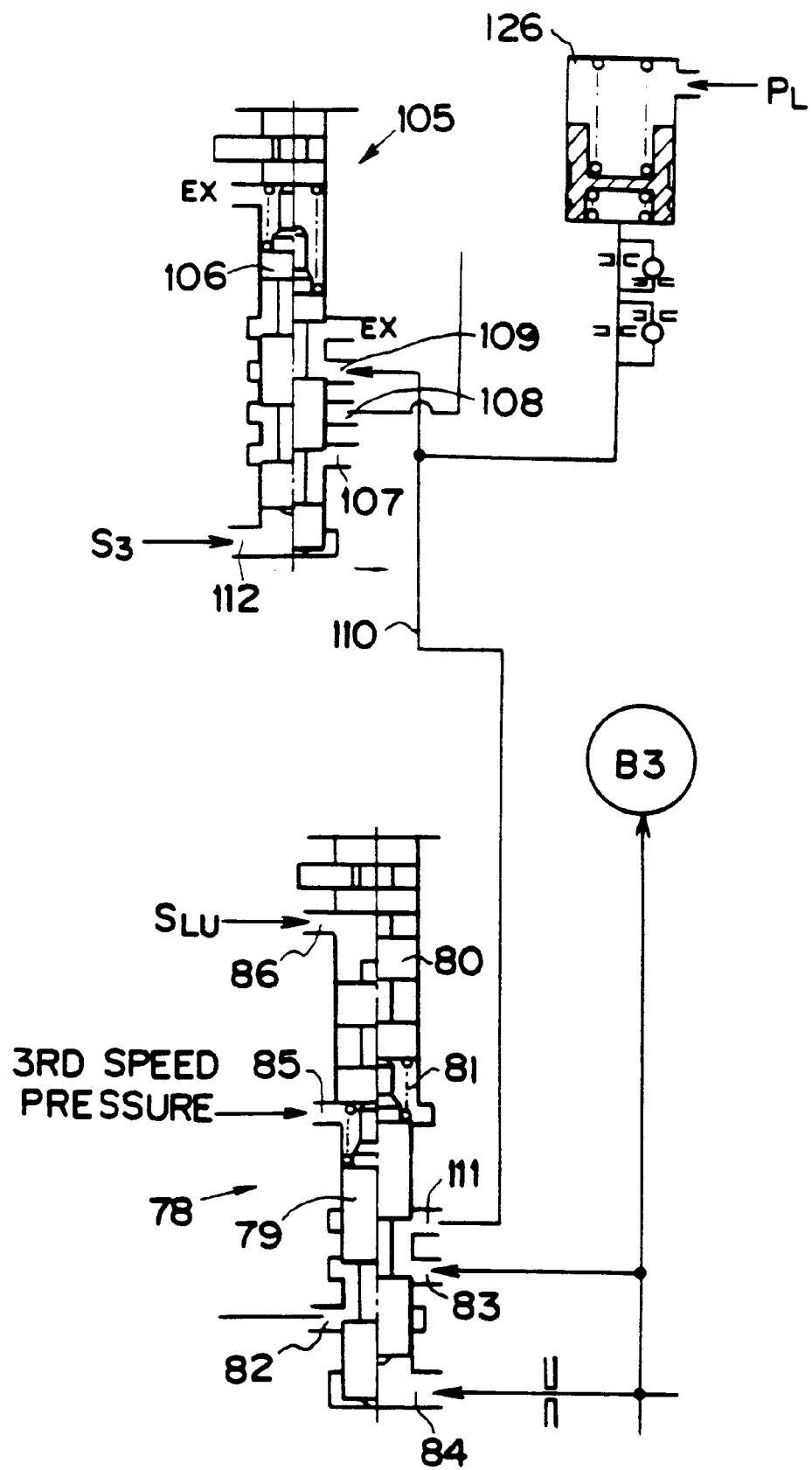
FIG. 11 is a diagram showing a portion of an oil pressure circuit in still another embodiment of the present invention.

In an embodiment shown in FIG. 11, an accumulator is connected as a damper 126 with the oil passage 110 which connects the port 111 of the B3 control valve 78 and the port 109 of the orifice control valve 105. This damper 126 has its back pressure chamber fed with such a back pressure, e.g., the line pressure PL as is controlled according to the engine load. With this construction, the oil pressure to be fed to the third brake B3 is damped through the oil passage 110 by that damper 126 even if the orifice control valve 105 has its spool 106 stuck to have its port 109 kept closed so that the B3 control valve 78 cannot regulate the pressure. As a result, the apply pressure of the third brake B3 can be prevented from abruptly rising to prevent the shifting shock from deteriorating.

Figure 12:
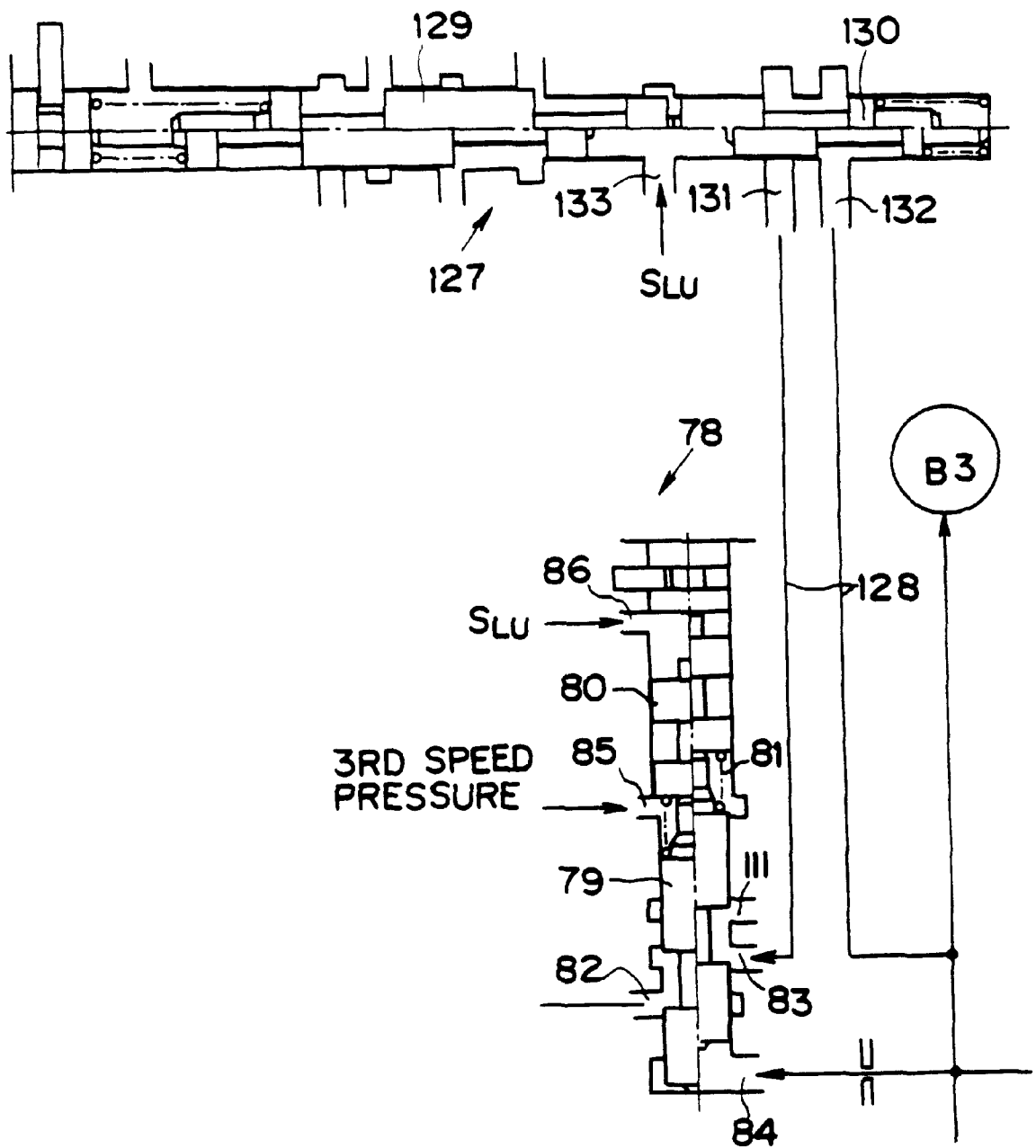
FIG. 12 is a diagram showing a portion of an oil pressure circuit in a further embodiment of the present invention.

An embodiment shown in FIG. 12 is constructed such that an oil passage 128 between the B3 control valve 78 and the third brake B3 is controlled by an orifice control valve 127 for the first clutch C1. Specifically, this control valve 127 is equipped with two spools 129 and 130, of which the spool 130, as located at the righthand side of FIG. 12, is adapted to open/close two ports 131 and 132 selectively. Of these, the port 131 is connected with the port 83 of the B3 control valve 78 whereas the other port 132 is connected with the third brake B3. Moreover, a port 133, as located between the aforementioned individual spools 129 and 130, is fed with the signal pressure of the linear solenoid valve SLU for the lockup clutch.

As a result, if the linear solenoid valve SLU is failed to have the maximum level of its signal pressure at all times, the B3 control valve 78 has its spool 79 fixed in the position, as shown at the lefthand half of FIG. 12, so that it does not perform its pressure regulating action. Simultaneously with this, however, the orifice control valve 127 for the first clutch C1 has its port 133 fed with the high signal pressure to have its ports 131 and 132 closed by its spool 130. As a result, the oil pressure 128 for feeding the oil pressure from the B3 control valve 78 to the third brake B3 is closed so that what is fed to the third brake B3 is the oil pressure through the orifice 76. In the case of this failure, therefore, the third brake B3 is slowly fed with the oil pressure so that it can be prevented from being abruptly applied, to prevent the shifting shock from deteriorating.

Figure 13:
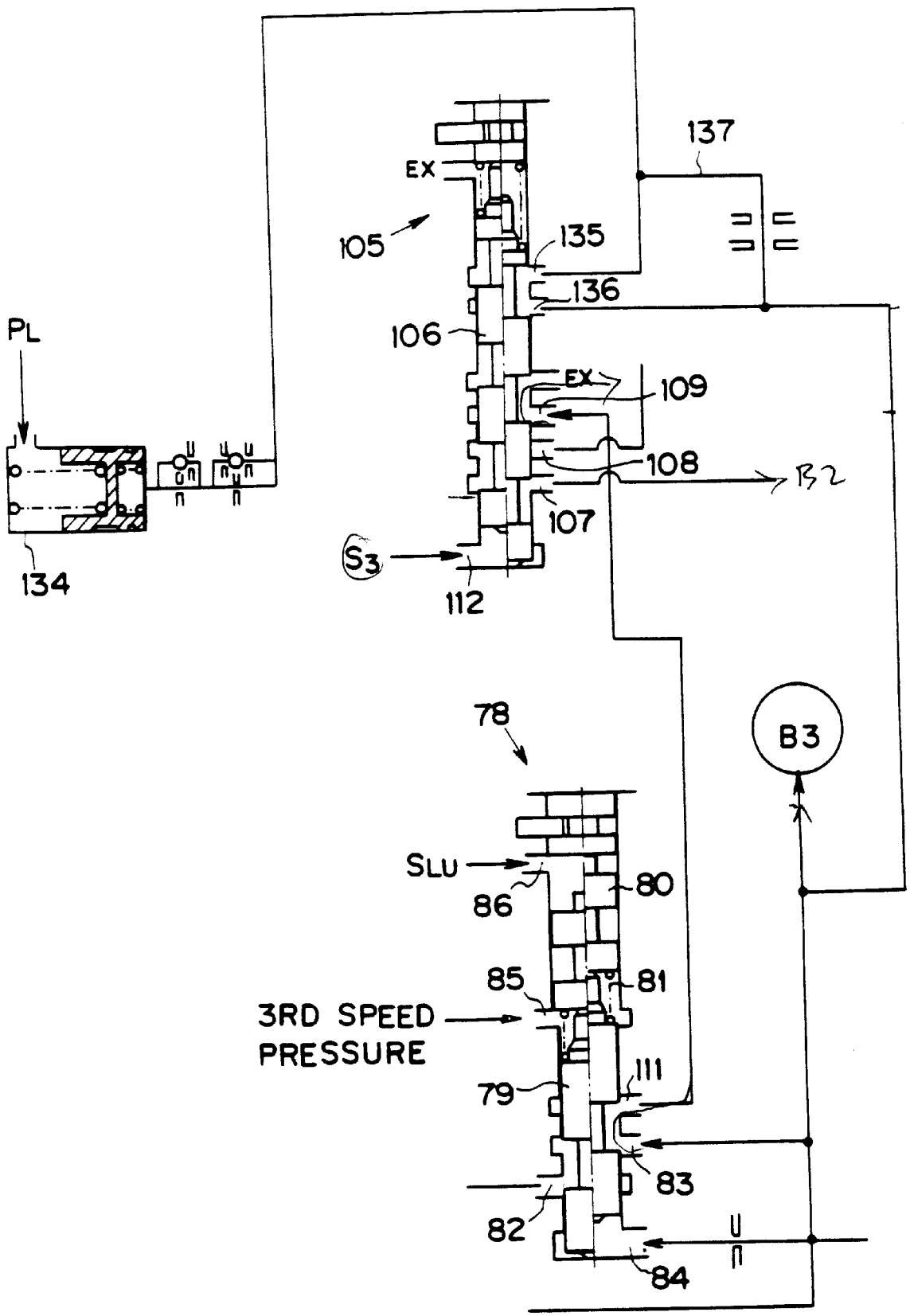
FIG. 13 is a diagram showing a portion of an oil pressure circuit in a further embodiment of the present invention.

An embodiment shown in FIG. 13 is constructed such that the apply pressure of the third brake B3 is damped by a damper 134 after the third brake B3 has been fast applied. In this embodiment, the orifice control valve 105 for the second brake B2 is additionally formed with two ports 135 and 136 to be selectively opened to or closed from each other. Of these, the port 135 is closed when the signal pressure is fed from the third solenoid valve S3 so that the spool 106 takes a position, as shown at the lefthand half of FIG. 13. This port 135 is connected to the third brake B3 whereas the other port 136 is connected to the damper 134. Incidentally, this damper 134 is fed with the line pressure PL, for example, as the back pressure. Moreover, an oil passage 137 having an orifice is provided for bypassing the aforementioned ports 135 and 136.

In the construction shown in FIG. 13, therefore, the orifice control valve 105 has its port 109 closed to keep the B3 control valve 78 from its pressure regulating action, if the oil pressure is fast applied to the third brake B3. Simultaneously with this, the orifice control valve 105 has its ports 135 and 136 closed so that the oil pressure is not fed to the damper 134 but fast applied to the third brake B3. After this fast application, the orifice control valve 105 has its spool 106 pushed down to a position, as shown at the righthand half of FIG. 13, so that its ports 135 and 136 acquire their communication to establish the communication of the third brake B3 with the damper 134. As a result, even if the oil pressure is abruptly applied to the third brake B3, the damper 134 acts to suppress any abrupt rise of the apply pressure of the third brake B3. In this case, moreover, the damper 134 is gradually fed with the oil pressure because of the action of the aforementioned oil passage 137.

Thus, in the construction shown in FIG. 13, the rise of the oil pressure after the fast application of the third brake B3 can be damped by the action of the damper 134 so that the shifting shock can be prevented even if the B3 control valve 78 is disabled to regulate the pressure of the third brake B3.

Incidentally, in the foregoing embodiment, the regulated level of the apply pressure of the third brake B3 is controlled by the signal pressure of the linear solenoid valve SLU, which is also used for controlling the lockup clutch. Therefore, the inhibition of the 2nd speed can also be effected by deciding the failure of the linear solenoid valve SLU on the basis of the decision of the applied state of the lockup clutch.

Figure 14:
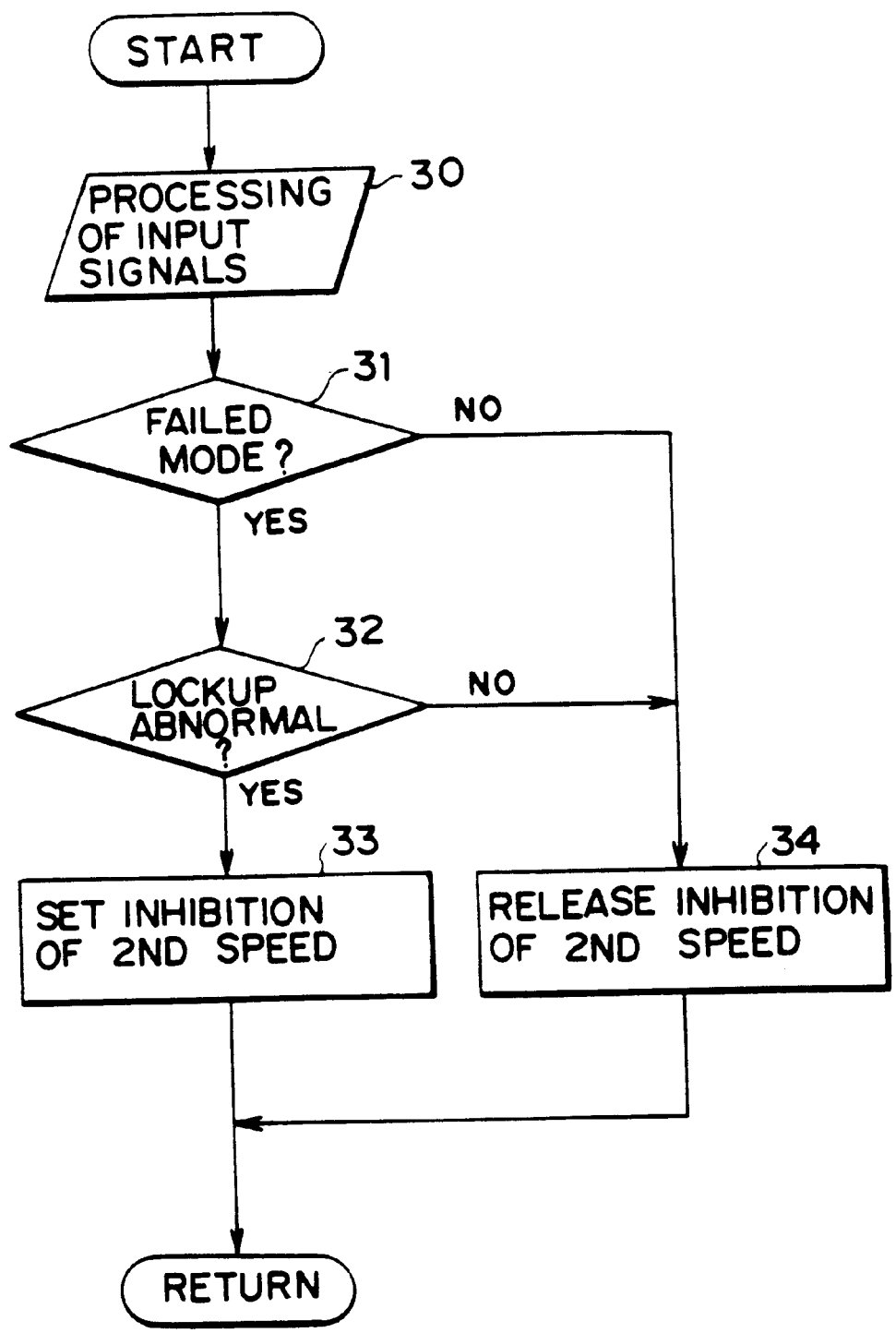
FIG. 14 is a flow chart showing a control routine for inhibiting the 2nd speed in response to an abnormal lockup.

FIG. 14 is a flow chart showing one example of the control routine. After processing of the input signals at Step 30, it is decided (at Step 31) whether or not it is in a failed mode. This failed mode corresponds to an abnormal situation such as a failure of any solenoid valve or a failure of the torque lowering control. If the answer of Step 31 is "YES", it is decided (at Step 32) whether or not the lockup is abnormal. This decision can be executed by comparing the ratio of the turbine R.P.M. in the state commanding a lockup (including a half lockup) to the engine R.P.M. with a value predetermined according to the running state including the vehicle speed or the throttle opening. If it is decided that the lockup is abnormal, an inhibition of the 2nd speed is set (at Step 33). This can be executed by setting a shift chart having no 2nd speed region, for example. Specifically, the abnormal lockup is not always but highly probably caused by the failure of the linear solenoid valve SLU, and hence the 2nd speed, i.e., the gear stage to be achieved by controlling the regulated pressure level with that linear solenoid valve SLU is inhibited. If the answer of Step 31 or Step 32 is "NO", the routine advances to Step 34, at which the inhibition of the 2nd speed is released.

Incidentally, the control of improving the shifting shock by lowering the engine torque at the time of a shift is carried out in the prior art. In case, however, the shift diagram is changed to that having no 2nd speed region, as described above, the control of reducing the engine torque at the time of a shift may preferably executed in the following manner.

Figure 15:
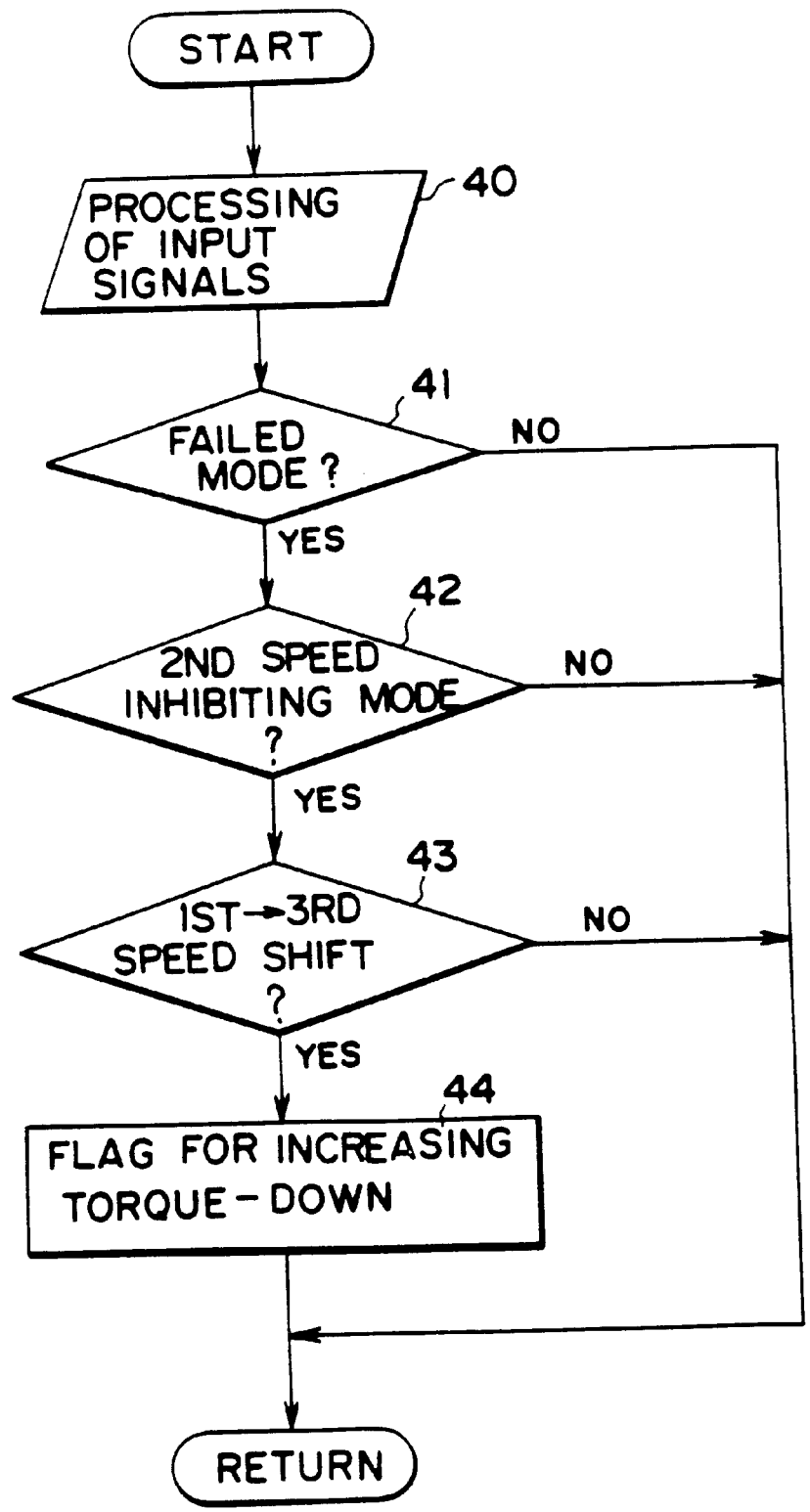
FIG. 15 is a flow chart showing a control routine for increasing a torque-down in case a shift from a 1st speed to a 3rd speed is decided as the 2nd speed is inhibited.

FIG. 15 is a flow chart showing a control routine for changing a reduction of the engine torque in case a shift from the 1st to 3rd speed is caused according to the change to the shift diagram shown in FIG. 7. After processing of the input signals (at Step 40), it is decided (at Step 41) whether or not it is in the failed mode. This failed mode corresponds to an abnormal situation such as a failure of any solenoid valve or a failure of the torque lowering control. If the answer of Step 41 is "YES", it is decided (at Step 42) whether or not the inhibition mode of the 2nd speed is set. Specifically, it is decided whether or not the shift control according to the shift diagram shown in FIG. 7 is carried out. If the 2nd speed is inhibited, it is decided (at Step 43) whether or not a shift from the 1st to 3rd speeds has been outputted. If the answer is "YES", a flag for increasing the torque-down of the engine is set (at Step 44). Incidentally, if the answer of the decision process of any of Steps 41 to 43 is "NO", the routine is returned without any control.

Specifically, the upshift to the 3rd speed is usually made from the 2nd speed so that the change in the rotation of the rotary element is higher at that time than at the upshift to the 3rd speed at the aforementioned time of failure. In order to prevent the shifting shock and the reduction of durability of the frictional engagement means, therefore, the reduction of the engine torque is made larger than that of the normal case of an upshift to the 3rd speed. This may be executed, for example, by latching the torque-down according to the throttle opening in the form of a map, by fetching a value according to the throttle opening detected, and by executing the torque-down control to achieve that value. One example of the map is tabulated in FIG. 16. Incidentally, letter θ in FIG. 16 designates a throttle opening and indicates the larger throttle opening for the larger subscripts.

Figure 17:
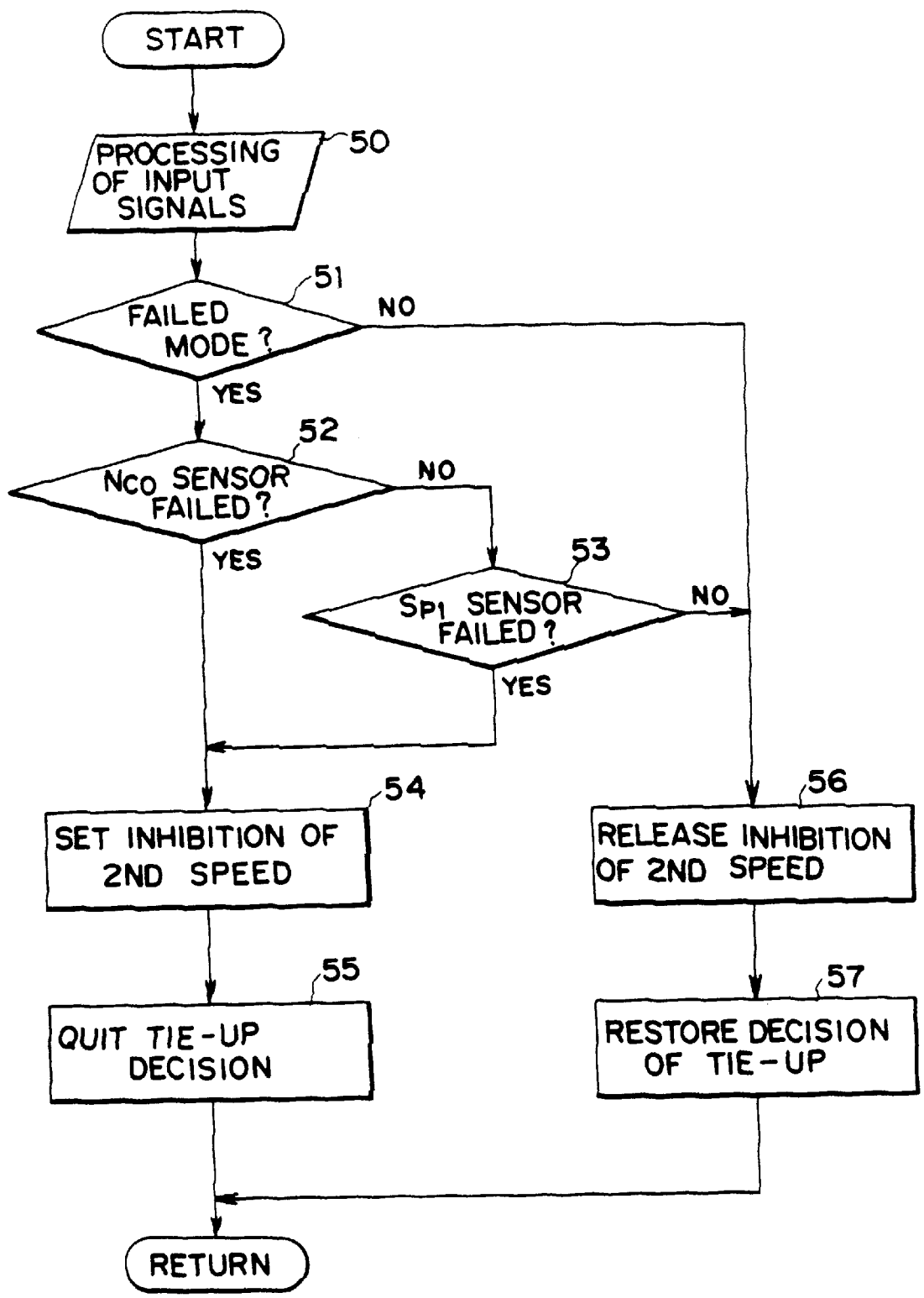
FIG. 17 is a flow chart showing a control routine for inhibiting the 2nd speed when sensors are failed.

As described above, the reason why the 2nd speed is inhibited is to prevent in advance the tie-up, in which both the second brake B2 and the third brake B3 are applied at the time of the shift from the 2nd to 3rd speeds. The possibility of this tie-up is invited by failures other than those of the aforementioned individual solenoid valves S3 and SLU. Specifically, the timings of feeding and releasing the oil pressures to and from those brakes B2 and B3 may be decided according to the advancing situations determined from the R.P.M. of the rotary elements. Therefore, a possibility of an excessive tie-up will rise if it occurs that the R.P.M. is unknown. FIG. 17 is a flow chart showing a control routine for inhibiting the 2nd speed in such case.

In this control, after processing of the input signals (at Step 50), it is decided (at Step 51) whether or not it is in a failed mode. If the answer is "YES", it is decided (at Step 52) whether or not the sensor for detecting the input R.P.M. of the automatic transmission A, i.e., the NC0 sensor for detecting the R.P.M. of the clutch C0 is failed. It is also decided (at Step 53) whether or not the sensor for detecting the output R.P.M. of the automatic transmission A, i.e., a first vehicle speed sensor SP1 is failed. If either of those sensors is failed, the advancing situation of the shift cannot be accurately grasped, and the tie-up may possibly arise at the clutch-to-clutch shift between the 2nd speed and the 3rd speed. If the answer of either the Step 52 or Step 53 is "YES", the routine advances to Step 54, at which the inhibition of the 2nd speed is set. This is a control for changing to the a shift diagram shown in FIG. 7, for example. At Step 55, the decision of the tie-up is quitted.

If, on the other hand, the answer of any of Steps 51 to 53 is "NO", the routine advances to Step 56, at which the inhibition of the 2nd speed is released, and the decision of the tie-up is restored at Step 57.

As a result, by the control shown in FIG. 17, both the second brake B2 and the third brake B3 can be prevented in advance from being applied to cause an excessive tie-up, so that those brakes B2 and B3 can be prevented from having their durability degraded.

In the case of an upshift from the 2nd to 3rd speeds, in the oil pressure circuit shown in FIG. 5, the overlaps of the second brake B2 and the third brake B3 are controlled by the 2–3 timing valve 87. As is apparent from the construction shown in FIG. 5, the load for pushing up the spool 88 of the 2–3 timing valve 87 to the position, as shown at the lefthand half of FIG. 5, becomes the higher for the higher signal pressure of the linear solenoid valve SLU so that the drainage from the third brake B3 is suppressed to elongate the overlap period. As a result, the signal pressure of the linear solenoid valve SLU is set in advance to a proper level, but the same or the control current of the linear solenoid valve SLU is changed by a learning control based upon the occurring situation of the tie-up, so as to cope with the quality dispersion.

Figure 18:
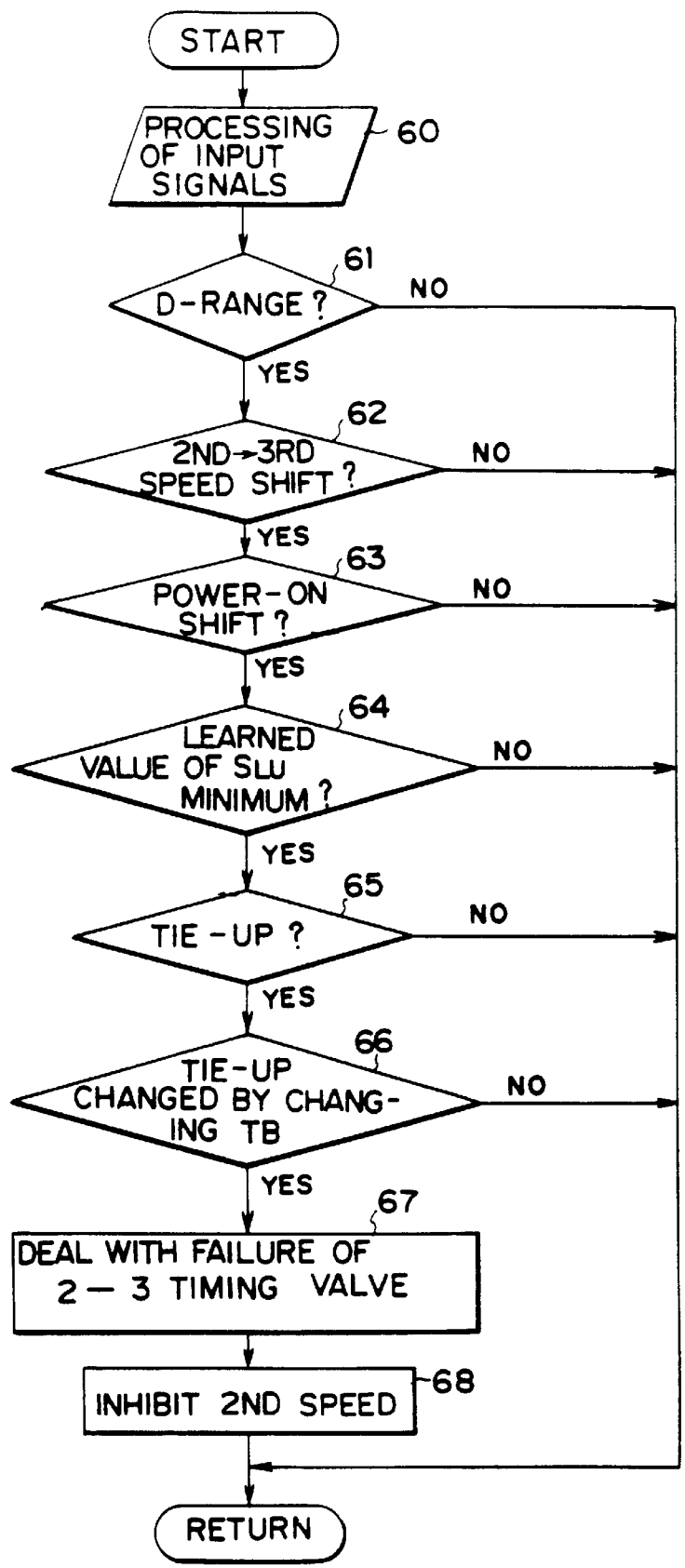
FIG. 18 is a flow chart showing a control routine for deciding failure of a 2–3 timing valve and inhibiting the 2nd speed.

If the tie-up still occurs even after the overlap state has been controlled by the linear solenoid valve SLU, it is thought that the 2–3 timing valve 87 is failed. In this case, too, it is desired to inhibit establishment of the 2nd speed itself. FIG. 18 is a flow chart showing a control routine for the inhibition.

After a first processing of the input signals (at Step 60), it is decided (at Step 61) whether or not the D-range is set. If in the D-range, it is decided (at Step 62) whether or not an upshift from the 2nd to 3rd speeds is outputted. It is also decided (at Step 63) whether or not the shift is to be carried out in the power-ON state. This is because the overlap control is to be executed at the shift in the power-ON state. If the answer of Step 63 is "YES", it is decided (at Step 64) whether or not the learned value of the linear solenoid valve SLU is minimized. This linear solenoid valve SLU controls the overlap state, as described above, and the overlap period becomes the shorter for the lower signal pressure (at a controlled level). If, therefore, the learned value is the minimum, the overlap state cannot be suppressed any more. Hence, the failure decision to be executed on and after Step 64 has to be premised by the fact that the answer of Step 64 is "YES".

If the answer of Step 64 is "YES", it is decided (at Step 65) whether or not the tie-up occurs. If this answer is "YES", it is decided (at Step 66) whether or not the tie-up is changed by changing the counted value of a timer TB. This timer TB controls the third solenoid valve S3 and is mapped in advance with parameters such as the vehicle speed or the throttle opening. The signal pressure to be outputted from the third solenoid valve S3 is fed to the port 112 of the timing valve 105 so that the timing for the drainage from the second brake B2 is controlled by the third solenoid valve S3. If, therefore, the tie-up is changed by changing the timer TB, it can be decided that the 2–3 timing valve 87 is failed. In short, if the answer of Step 66 is "YES", the routine advances to Step 67, at which the failure of the 2–3 timing valve 87 is dealt with. Then, the 2nd speed is inhibited at Step 68. Here, the routine is returned without any control if the answer of any of Steps 61 to 66 is "NO".

As a result, the excessive tie-up between the second brake B2 and the third brake B3, as accompanies the malfunction of the 2–3 timing valve 87 is prevented to prevent these brakes B2 and B3 from deteriorating.

The example of the control described above belongs to the control of inhibiting the 2nd speed in accordance with the failure of the 2–3 timing valve 87. In case the aforementioned control valve 105 is failed, the excessive tie-up may also occur. In this case, too, it is preferred that the 2nd speed is inhibited, as will be described in the following.

Figure 19:
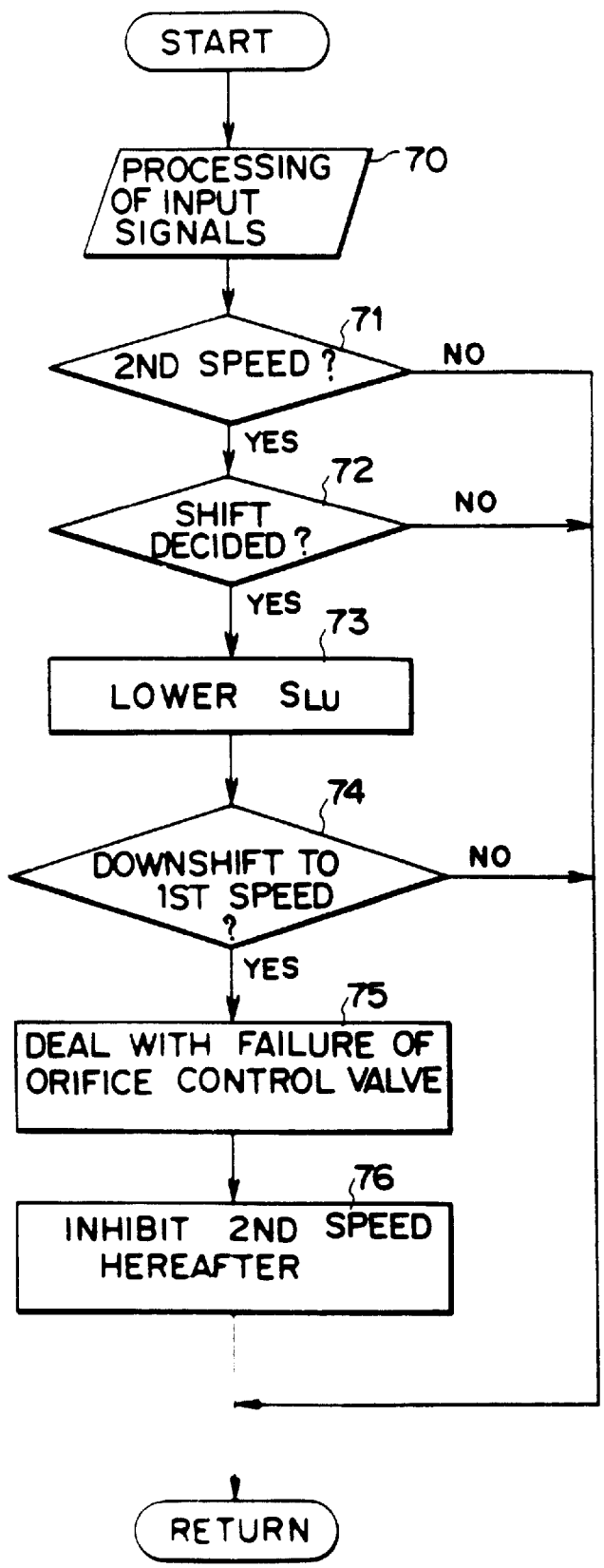
FIG. 19 is a flow chart showing a control routine for deciding failure of an orifice control valve and inhibiting the 2nd speed.

In FIG. 19, after processing of the input signals at Step 70, it is decided (at Step 71) whether or not the 2nd speed is set. If this answer is "YES", it is decided (at Step 72) whether or not a shift to another gear stage is decided. That is, it is decided whether or not it is in the stable state of the 2nd speed. If the answer of Step 72 is "YES" to imply the stable state of the 2nd speed, the signal pressure to be outputted from the linear solenoid valve SLU is lowered (i.e., the control of lowering the SLU) (at Step 73), and it is decided (at Step 74) whether or not it is a downshift to the 1st speed. If this answer of Step 74 is "YES", the failure of the orifice control valve 105 is dealt with (at Step 75).

Specifically, with the orifice control valve 105 being failed, the downshift to the 1st speed is caused when the torque capacity of the third brake B3 is reduced by lowering the signal pressure of the linear solenoid valve SLU. If, therefore, the start of this shift is detected in terms of the R.P.M. of a predetermined rotary element, it can be decided that the orifice control valve 105 is failed. After this failure has been dealt with, the setting of the 2nd speed hereinafter is inhibited (at Step 76). Here, the routine is returned without any control if the answer of Step 71 or Step 72 is "NO".

With the control shown in FIG. 19, therefore, the clutch-to-clutch shift between the 2nd and 3rd speeds is not caused in the situation where the oil pressure of the second brake B2 cannot be accurately controlled. Thus, it is possible to prevent the excessive tie-up, which might otherwise be caused as a result that both the second brake B2 and the third brake B3 are applied, and accordingly to prevent the durability of the two brakes B2 and B3 from deteriorating.

Figure 20:
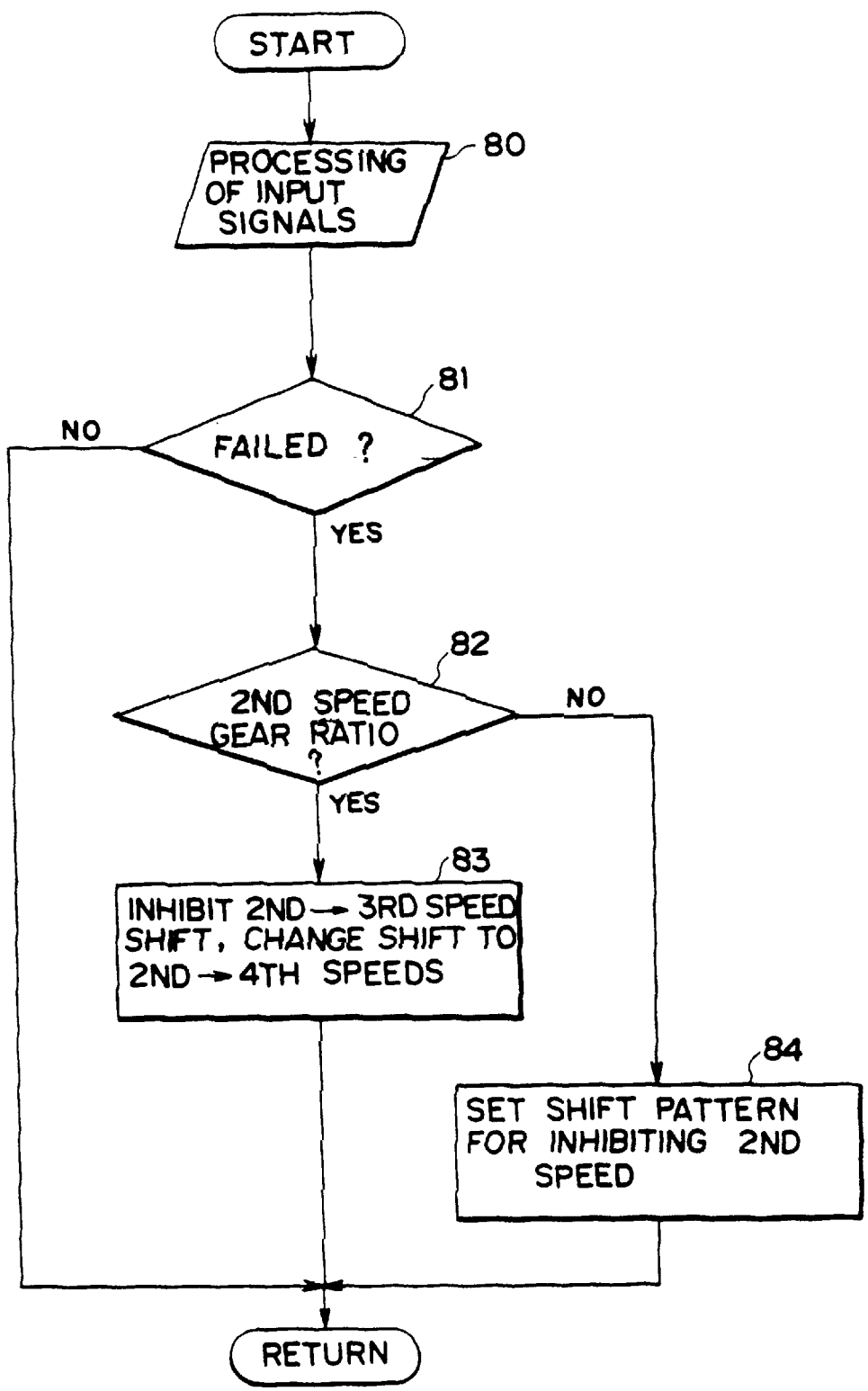
FIG. 20 is a flow chart showing a control routine in case the gear stage is at the 2nd speed when a failure is decided.

The following control is carried out in case such a failure occurs at the 2nd speed as will probably cause the excessive tie-up at the time of the aforementioned clutch-to-clutch shift. As shown in FIG. 20, after processing of the input signals (at Step 80), it is decided (at Step 81) whether or not the aforementioned solenoid valves S3 and SLU and the valves 87 and 105 are failed. If the answer of this decision is "NO", the routine is returned. If the failure occurs, it is decided (at Step 82) whether or not the present gear stage is at the 2nd speed. If a shift is made from the present gear stage of the 2nd speed to the 3rd speed, there may probably arise the clutch-to-clutch shift to cause the tie-up between the second brake B2 and the third brake B3. In this case, the shift from the 2nd to 3rd speeds is inhibited and changed to that from the 2nd to 4th speeds (at Step 83). If, on the other hand, the answer of Step 82 is "NO", the routine advances to Step 84, at which is set a shift pattern for inhibiting the 2nd speed.

In this control shown in FIG. 20, therefore, the clutch-to-clutch shift, in which neither the second brake B2 nor the third brake B3 participate, is not executed so that the excessive tie-up, which might otherwise be caused by an inaccurate control of the oil pressure, can be prevented in advance to prevent those brakes B2 and B3 from deteriorating.

Generally speaking, the signal pressure of the solenoid valve SLU or the ON/OFF timing of the third solenoid valve S3, as described above, are sequentially corrected on the basis of the actual tie-up or the blow-up state of the engine E. In short, the learning control is executed to effect a control matching the actual situation. In case, however, it happens that this learning control cannot be accomplished, as normal, the possibility of the excessive tie-up rises. In this case, therefore, there is made a control shown in FIG. 21.

Figure 21:
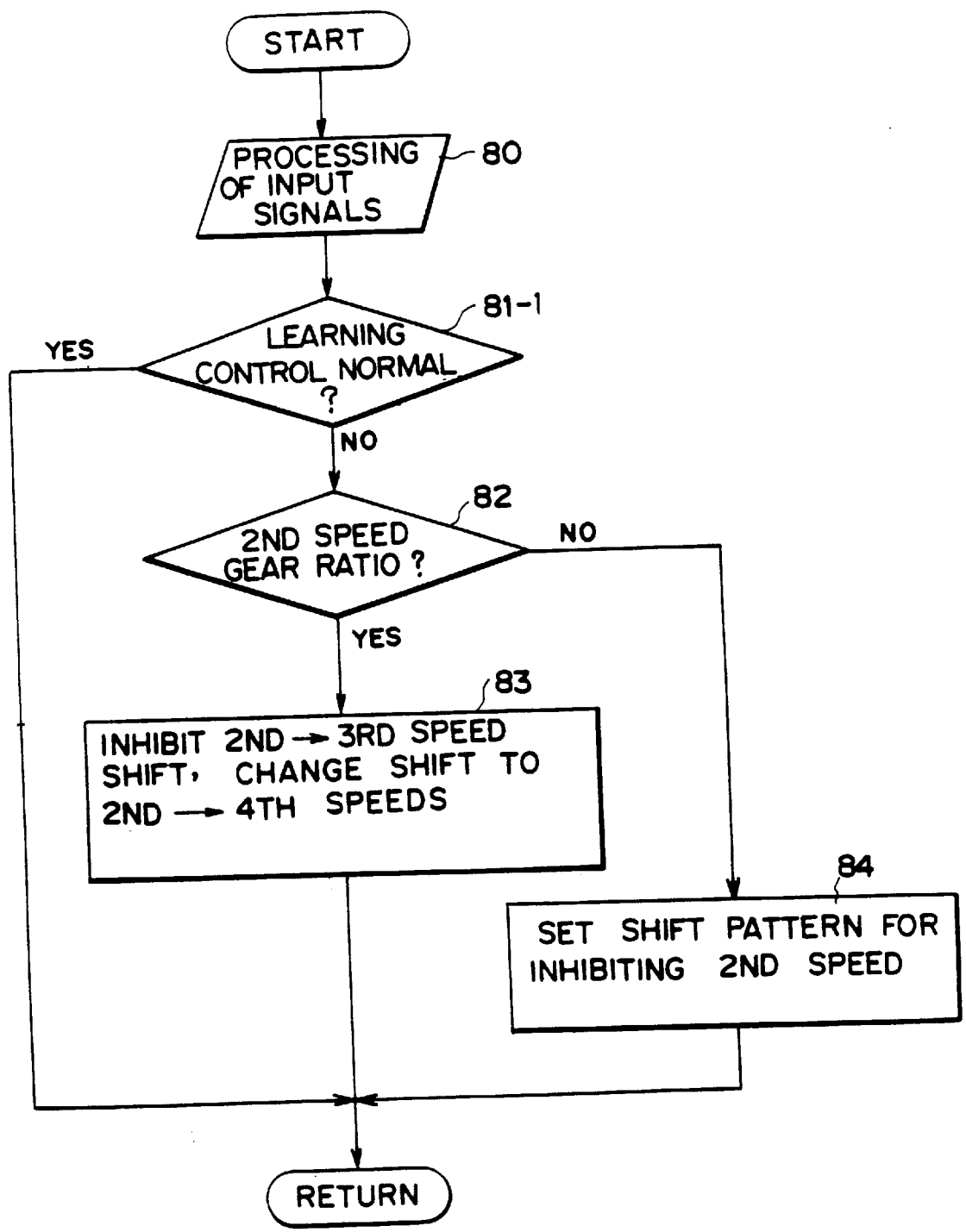
FIG. 21 is a flow chart showing a control routine in case the gear stage is at the 2nd speed when a learning control for preventing a tie-up becomes abnormal.

This control routine shown in FIG. 21 is modified from that shown in FIG. 20 such that the operation of Step 81 is changed into the operation of Step 81-1 to decide whether or not the learning control is normal. In case, therefore, the learning control is not executed, as normal, either the clutch-to-clutch shift from the 2nd to 3rd speeds or the 2nd speed is inhibited, so that the excessive tie-up can be avoided in advance to prevent the durability of the brakes B2 and B3 from deteriorating.

Figure 22:
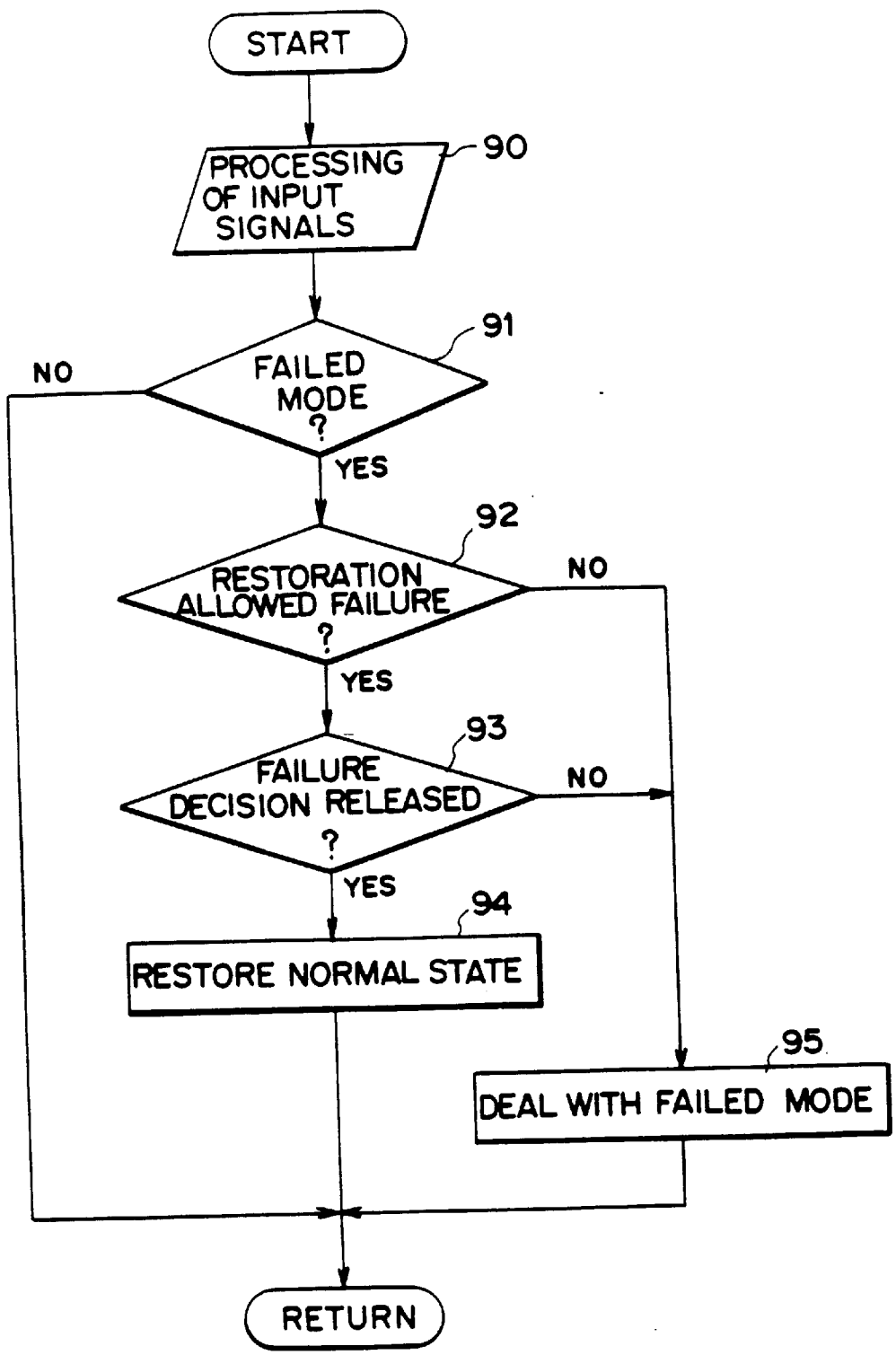
FIG. 22 is a flow chart showing a control routine for restoring a restorable failure.

The failed mode for avoiding the clutch-to-clutch shift may be set by deducing the failure of the linear solenoid valve SLU from the failure of the lockup clutch and can then be restored by deciding elimination of the failure. In the case of a failed mode in which the failure cannot be decided without actually executing the clutch-to-clutch shift between the 2nd and 3rd speeds, no special restoration is executed from that failed mode. FIG. 22 is a flow chart showing a restoration in the case of the former failed mode. After processing of the input signals at Step 90, it is decided (at Step 91) whether or not it is in a failed mode. The routine is returned if the answer is "NO". If in the failed mode, on the other hand, it is decided (at Step 92) whether or not a restoration of failure is allowed in the failed mode. It is then decided at Step 93 whether or not the failure decision can be released. If the answer is "YES", the normal state is restored (at Step 94). On the other hand, if the restoration of the failed mode cannot be decided and if the failure decision cannot be released, the routine advances to Step 95, at which the failed mode is dealt with.

As described above, the inhibition of the 2nd speed at the time of a failure is executed to prevent the durability of the brakes B2 and B3 from being degraded by the excessive tie-up. This degradation of the durability of the brakes B2 and B3 may be allowed for a slight slip because it is caused by an excessive slip. Specifically, even in case it is decided that the tie-up is caused at the time of the shift from the 2nd to 3rd speed by a failure, for example, the clutch-to-clutch shift from the 2nd to 3rd speeds may be allowed if the throttle opening is so small that a load to be applied to the frictional engagement means is light.

Figure 23:
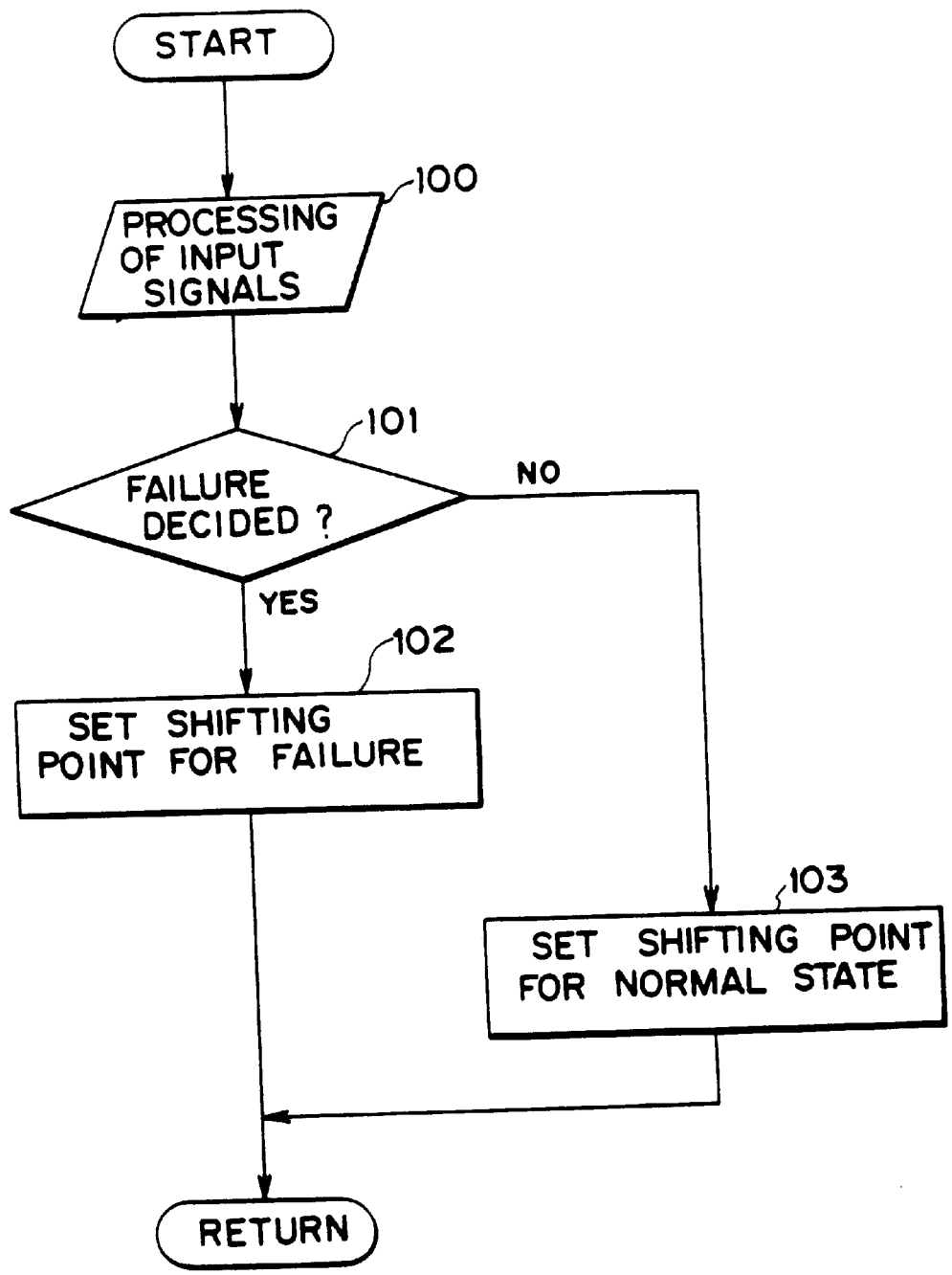
FIG. 23 is a flow chart showing a control routine for changing the shifting point according to the decision of a failure.
Figure 24:
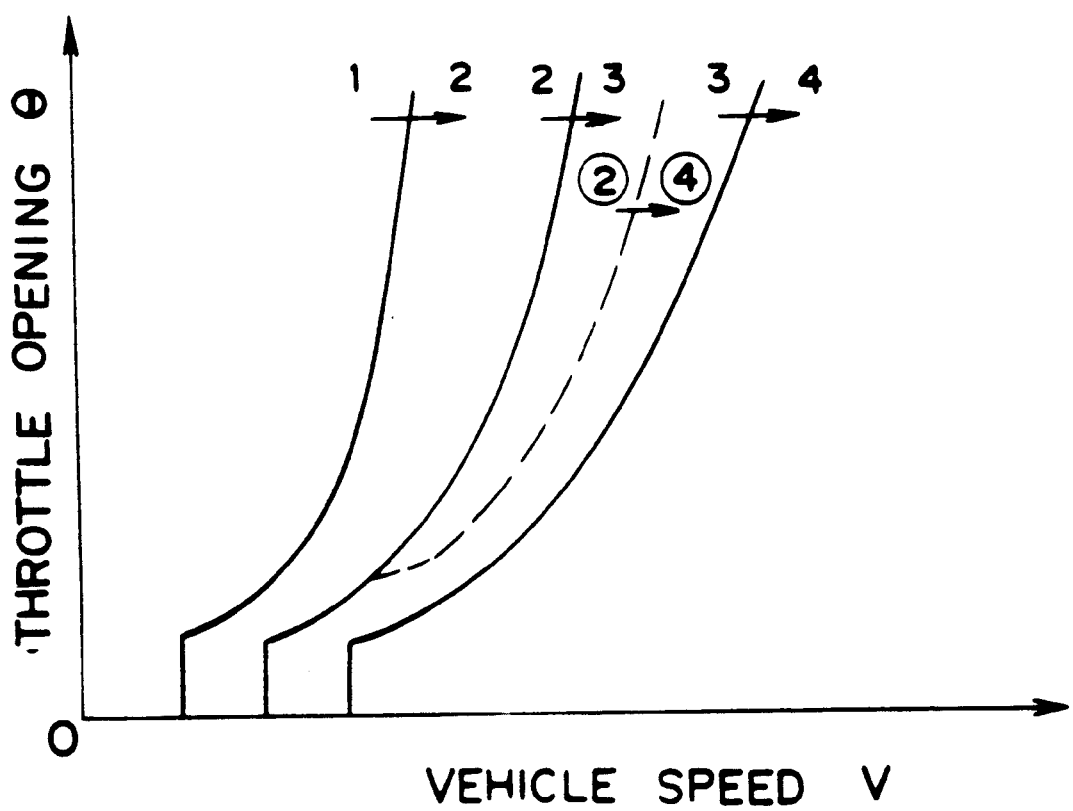
FIG. 24 is a conceptional graph illustrating one example of a shift diagram to be used for changing the shifting point at the time of a failure.

FIG. 23 is a flow chart showing a control routine therefor. After processing of the input signals (at Step 100), it is decided (at Step 101) whether or not the failure decision is executed. If the answer is "YES", a shifting point for a failure is set (at Step 102). FIG. 24 illustrates one example of the shifting point. A broken curve appearing in FIG. 24 indicates the upshift point at the time of a failure. Specifically, an upshift curve from the 2nd to 3rd speeds is provided for a smaller throttle opening. For a predetermined or larger throttle opening, on the other hand, an upshift curve from the 2nd to 4th speeds is set to a rather higher vehicle speed side in place of the upshift curve from the 2nd to 3rd speeds. For a smaller throttle opening, therefore, the 2nd speed can be set even at the time of a failure so that an excellent drivability can be achieved. For a larger throttle opening, on the other hand, the 2nd speed is inhibited so that the clutch-to-clutch shift and the accompanying tie-up can be avoided to prevent the durability of the brakes B2 and B3 from deteriorating.

On the other hand, if the answer of Step 101 is "NO" because of no failure decision, a shifting point for a normal state is set at Step 103, as exemplified by a solid curve in FIG. 24.

Figure 25:
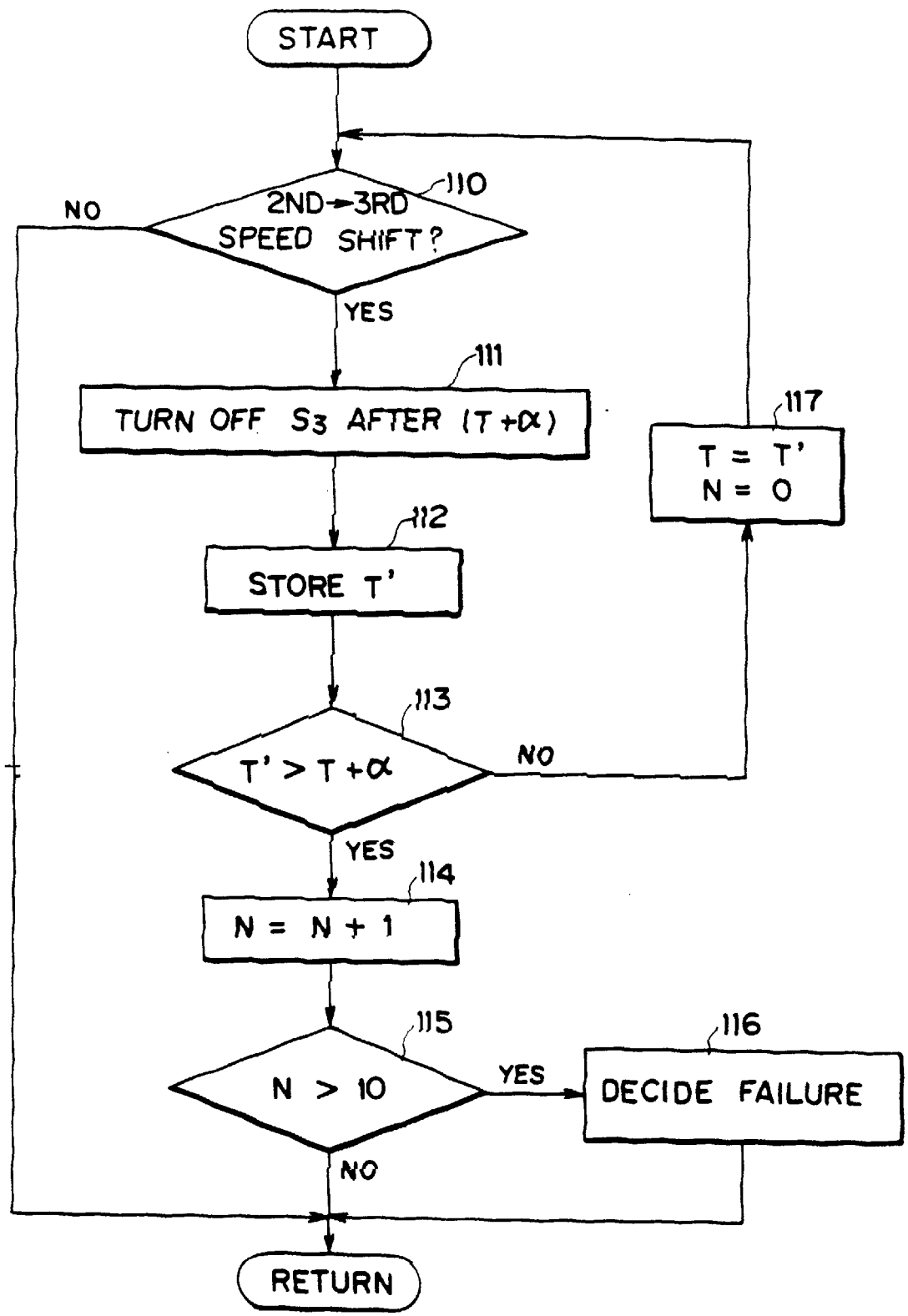
FIG. 25 is a flow chart showing a control routine for deciding a failure of the 2–3 timing valve on the basis of a time period till the start of an inertial phase.

Here will be described a control for deciding a failure of the 2–3 timing valve 87 on the basis of a time period before the inertial phase starts. In FIG. 25, it is decided (at Step 110) whether or not the shift from the 2nd to 3rd speeds is outputted. The routine is returned, if the answer is "NO", but advances to Step 111, at which the third solenoid valve S3 is turned OFF after lapse of a summed time period (T+α) of a predetermined time period T and a predetermined value α, if the answer is "YES". The third solenoid valve S3 is of the normally closed type so that it outputs its signal pressure, when turned OFF, to act upon the control port 112 of the orifice control valve 105. As a result, the orifice control valve 105 has its spool 106 pushed up to a position, as shown at the lefthand half of FIG. 5, so that the second brake B2 is applied to change a rotational speed.

At subsequent Step 112, there is stored a time period T' till the rotation changes. At Step 113, it is decided whether or not the stored time period T' is longer than the period (T+α). If the answer is "YES", the 2–3 timing valve 87 may probably be failed, because the third solenoid valve S3 is turned OFF to switch the orifice control valve 105 so that the inertial phase has started. If the answer of Step 113 is "YES", therefore, the counted value N is incremented by "1" at Step 114, and it is decided (at Step 115) whether or not the counted value N has exceeded "10". If the counted value is no more than "10", the routine is returned to repeated the above-specified Steps. As a result, a failure is decided (at Step 116) when the counted value N exceeds "10". Incidentally, if the answer of Step 113 is "NO", the routine advances to Step 117, at which the starting time T of the inertial phase is updated by the time period T' stored at Step 112. Then, the counted value N is cleared to zero, and the routine is returned to upstream of Step 110. If a failure is thus decided, any of the foregoing inhibitions of the 2nd speed is executed.

Figure 26:
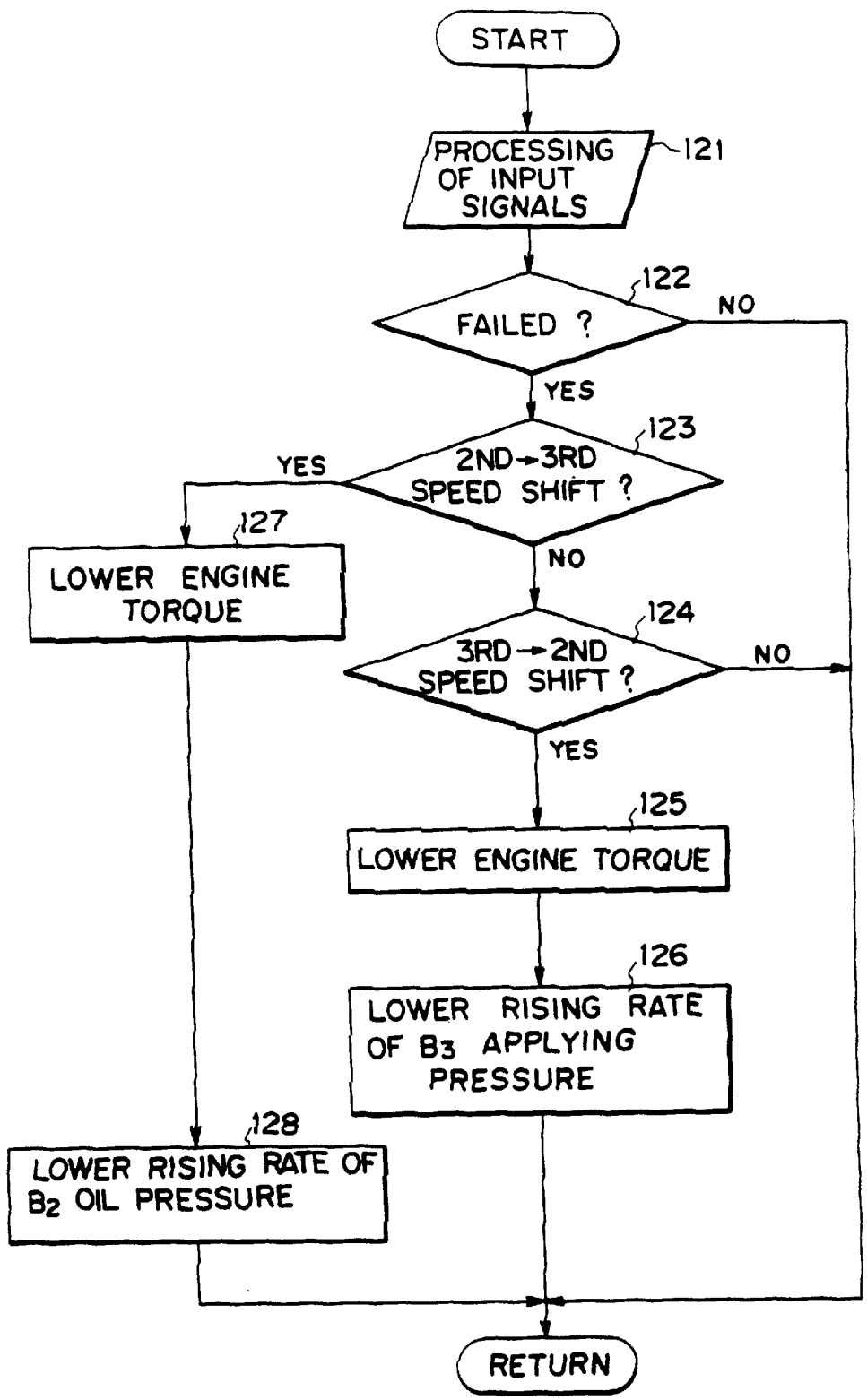
FIG. 26 is a flow chart showing a control routine for lowering the engine torque at the time of a failure and the rising rate of an apply pressure.

What exerts influences upon the durability of the second brake B2 and the third brake B3 is their simultaneous application and the torque to be loaded in that state. Hence, these two factors are preferably lightened in the failed state where those brakes B2 and B3 are tied up. An example of the control routine therefor is shown in FIG. 26. After processing of the input signals (at Step 121), it is decided (at Step 122) whether or not a failure decision for causing the excessive tie-up between the two brakes B2 and B3 is executed. This specific procedure has been described hereinbefore. The routine is returned if the failure decision is not executed. If this decision is executed, on the other hand, it is decided (at Step 123) whether or not the shift from the 2nd to 3rd speeds has been outputted. If this answer is "NO", it is further decided (at Step 124) whether or not the shift from the 3rd to 2nd speeds has been outputted. If this answer is "YES", the torque of the engine E is lowered (at Step 125). This lowering operation is instantly executed, if the excessive tie-up is detected or if the inertial phase is not started, as predetermined, or may be executed by making a decision from the timer or the R.P.M. of a rotary element.

Figure 27:
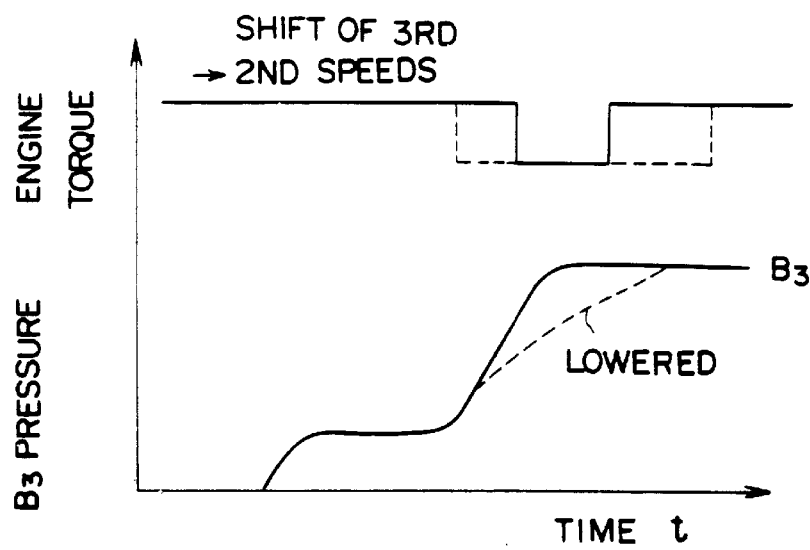
FIG. 27 is a time chart illustrating the changes in the engine torque and the third brake applying pressure for the controls.

Since the torque to be borne by the third brake B3 is lowered by lowering the engine torque, the rising rate of the apply pressure of the brake B3 is lowered (at Step 126). FIG. 27 illustrates the changes in the engine torque and the apply pressure of the third brake B3. Broken curves appearing in FIG. 27 indicate the changes in case the aforementioned control is executed. Even at the time of a failure, therefore, when the third brake B3 and the second brake B2 are tied up, any excessive slip of the third brake B3 can be avoided to prevent deterioration of its durability.

Figure 28:
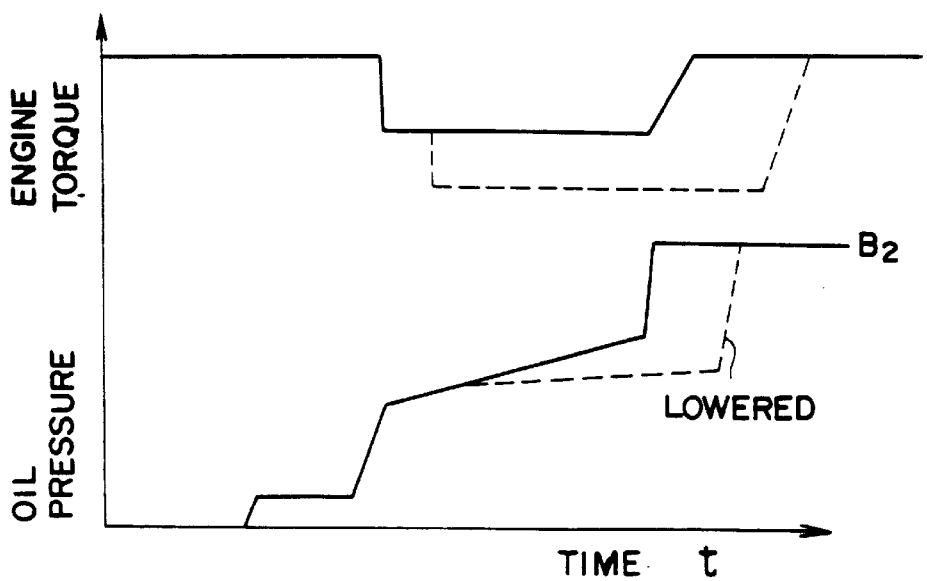
FIG. 28 is a time chart illustrating the changes in the engine torque and the third brake applying pressure for the controls.

If the answer of Step 123 is "YES", on the other hand, the routine advances to Step 127, at which the toque of the engine E is lowered, and the rising rate of the oil pressure of the second brake B2 is lowered (at Step 128). The changes in the engine torque and the second brake pressure for that control are illustrated by broken curves in FIG. 28. In this case, therefore, any excessive slip of the second brake B2 can also be avoided to prevent deterioration of its durability.

In the aforementioned hydraulic circuit shown in FIG. 5, the 2–3 timing valve 87 controls the drainage of the third brake B3 in accordance with the level of the oil pressure of the second brake B2, and the B3 control valve 78 controls the drainage of the third brake B3 by the timer. As a result, the excessive tie-up of those brakes B2 and B3 can be avoided by those valves 87 and 78 forming a main part of the pressure regulating mechanism so that a higher reliability can be retained. In other words, the possibility of the excessive tie-up rises if either of those valves 87 or 78 fails. In this case, therefore, it is arbitrary to inhibit the shift between the 2nd speed and the 3rd speed, i.e., the clutch-to-clutch shift, as exemplified in FIG. 29.

Figure 29:
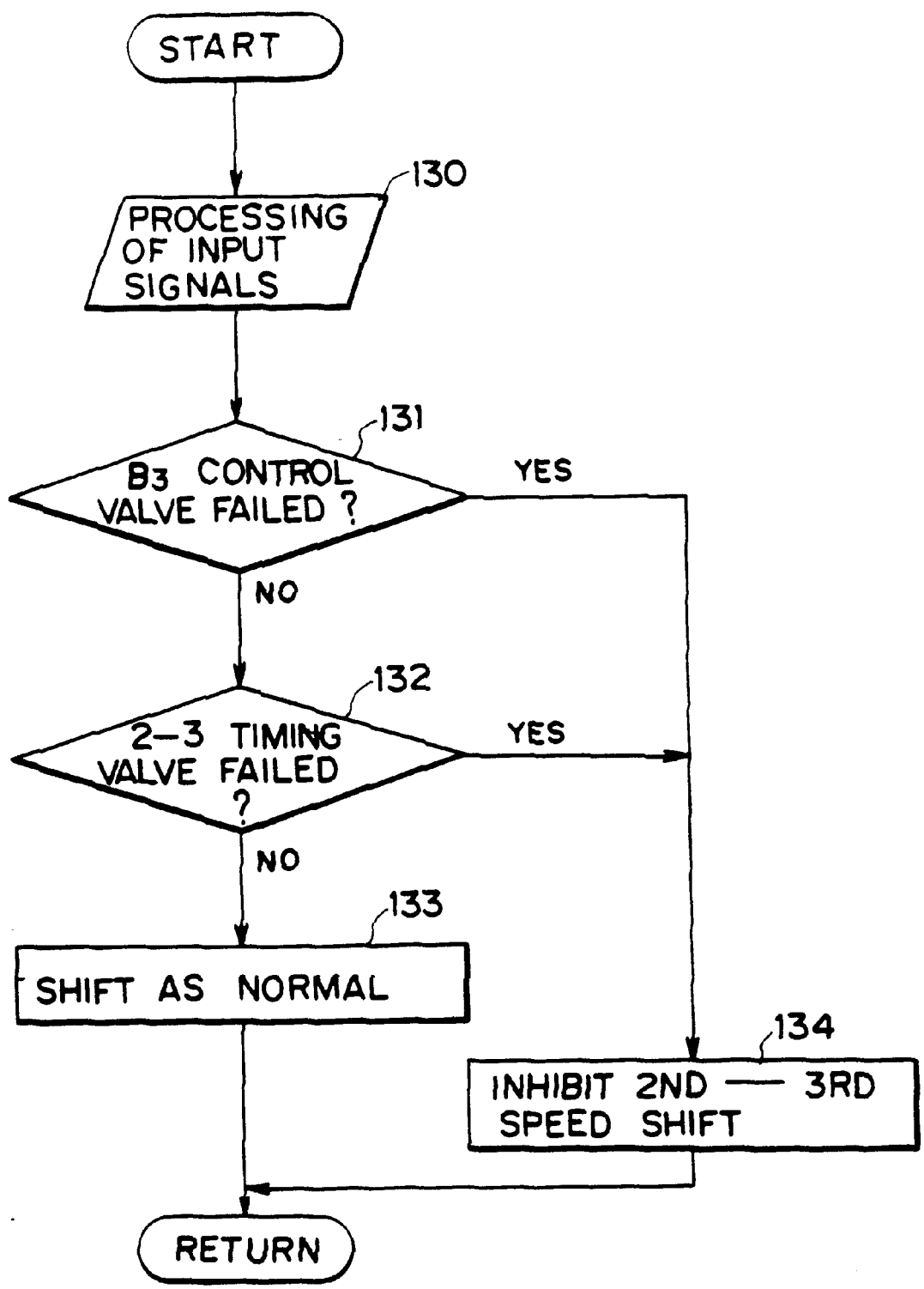
FIG. 29 is a flow chart showing a control routine in case either a B3 control valve or the 2–3 timing valve is failed.

As shown in FIG. 29, after processing of the input signals (at Step 130), it is sequentially decided whether or not the B3 control valve 78 is failed (at Step 131) and whether or not the 2–3 timing valve 87 is failed. The operations of those Steps 131 and 132 are another example of the failure detecting means. If neither the valve 78 nor the valve 87 is failed, the normal shifting is executed (at Step 133). If either the valve 78 or 87 is failed, on the other hand, the shift between the 2nd speed and the 3rd speed is inhibited (at Step 134). This inhibition may be specifically exemplified by changing the shift diagram to one having no 2nd speed region.

Incidentally, in the foregoing individual examples, the oil pressure of the third brake B3 is regulated by the B3 control valve 78. In short, according to the present invention, the oil pressure of the third brake B3 may be controlled independently of the oil pressure of the second brake B2, and a hydraulic circuit, as shown in FIG. 30, may be incorporated.

Figure 30:
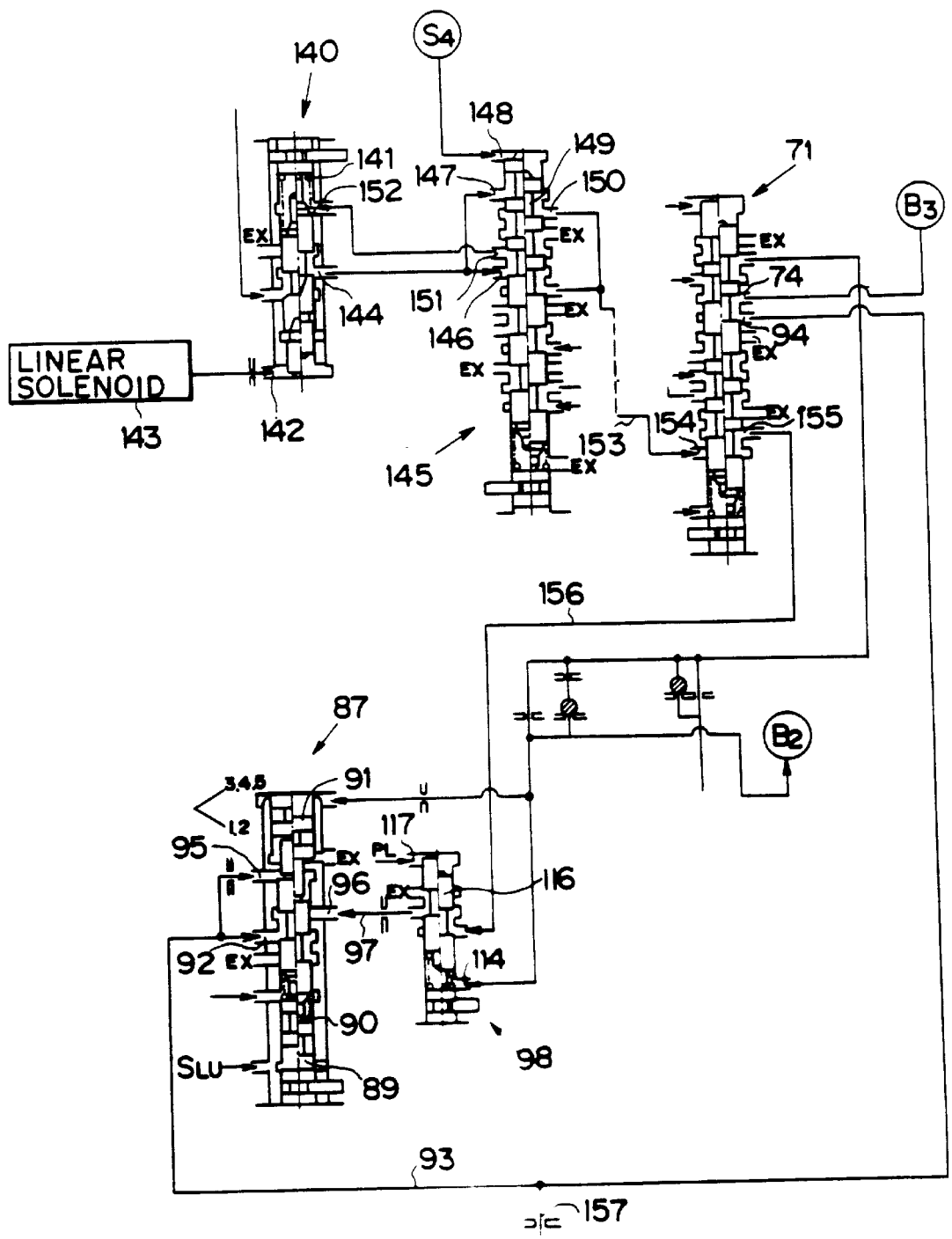
FIG. 30 is a diagram showing a portion of a further oil pressure circuit to be used in the present invention.

The hydraulic circuit, as shown in FIG. 30, is constructed such that the oil pressure of the third brake B3 is regulated by a pressure control valve 140. This pressure control valve 140 is enabled to regulate the oil pressure by feeding a signal pressure from a linear solenoid valve 143 to a control port 142 which is formed at the side opposed to a spring 141. For the higher signal pressure, specifically, the regulated pressure takes the lower level so that the oil pressure to be outputted accordingly takes the lower level. This pressure control valve 140 has its output port 144 connected to ports 146 and 147 of an engine braking relay valve 145. This engine braking relay valve 145 is controlled by the fourth solenoid valve S4. Specifically, when the engine braking relay valve 145 has its control port 148 fed with the signal pressure from the fourth solenoid valve S4, its spool 149 is pushed down to a position, as shown at the righthand half of FIG. 30, so that its port 147 communicates with an output port 150. In the absence of the feed of the signal pressure to the control port 148, on the other hand, the spool 149 is pushed up to a position, as shown at the lefthand half of FIG. 30, so that the port 146 communicates with a return port 151. As a result, the oil pressure is fed from the return port 151 to a hold port 152 of the pressure control valve 140.

The output port 150 of the engine braking relay valve 145 is connected through an oil passage 153 to a port 154 of the 2–3 shift valve 71. This port 154 is caused to communicate with a port 155 at a gear stage for a 3rd or higher speed. This port 155 is connected via an oil passage 156 and through the B3 apply valve 98 to the port 96 of the 2–3 timing valve 87. Moreover, the hydraulic circuit shown in FIG. 30 is not equipped with the aforementioned B3 control valve 78 so that the third brake B3 is connected to the port 74 of the 2–3 shift valve 71. Incidentally, the oil passage 93 connecting the 2–3 timing valve 87 and the 2–3 shift valve 71 is drained through a smaller orifice 157.

Figure 31:
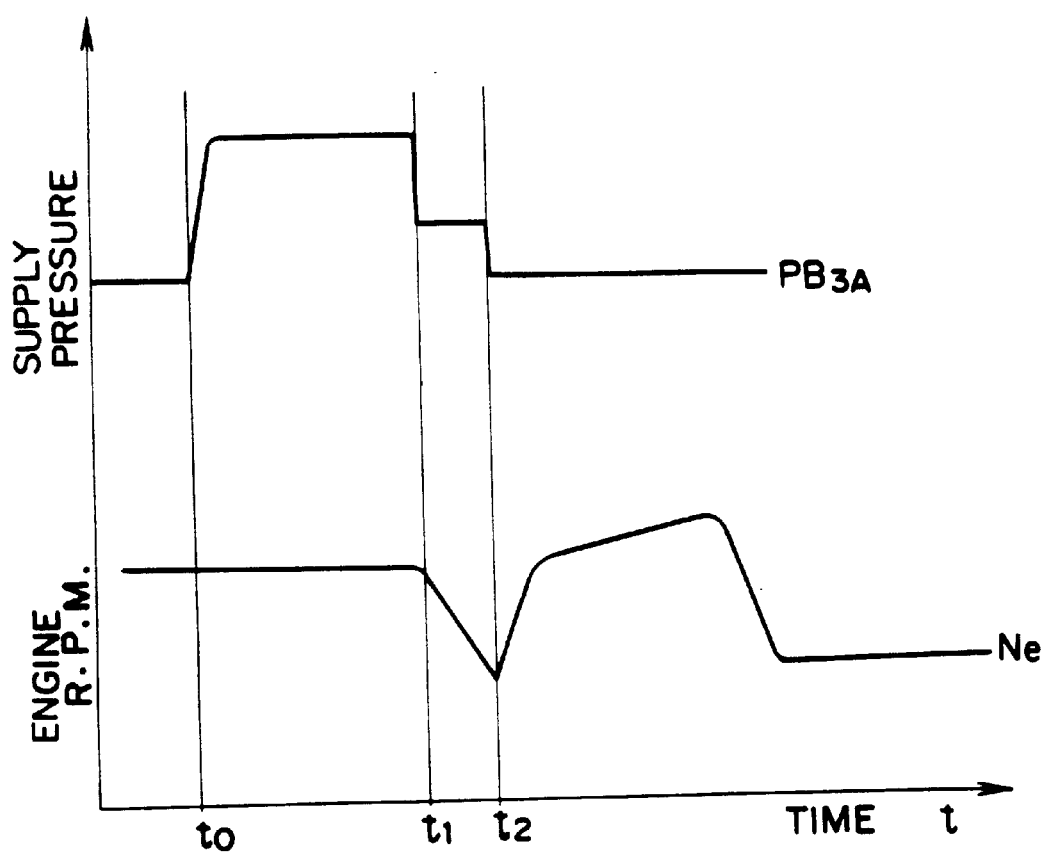
FIG. 31 is a time chart illustrating the changes in the oil pressure and the engine R.P.M. in case the supply pressure to a third brake is controlled by a pressure control valve at the time of shifting from the 2nd to 3rd speeds.

According to this hydraulic circuit shown in FIG. 30, the apply pressure of the third brake B3 is so controlled at the time of the upshift from the 2nd to 3rd speeds as to establish an overlap state in the torque phase, as shown in FIG. 31. Specifically, at a time $t_0$ when the 2–3 shift valve 71 is switched according to the decision of the shift from the 2nd to 3rd speeds, the oil pressure (as will be tentatively referred to as the "supply pressure") PB3A to be fed to the B3 apply valve 98 is controlled to the line pressure by the pressure control valve 140. This controlled pressure is kept till a time $t_1$, which the torque phase is started, and is fast applied. The pressure is further controlled to a lower level, when the torque phase is started, and is controlled substantially or absolutely to zero at a time $t_2$ when the inertial phase is started.

Thus, even if either the 2–3 timing valve 87 or the B3 apply valve 98 is stuck at the time of an upshift to the 3rd speed, for example, the supply pressure itself to the third brake B3 is blocked, and this third brake B3 is drained through the aforementioned smaller orifice 157. As a result, the sufficient reduction of the oil pressure of the third brake B3 at all times is ensured if the oil pressure is fed to the second brake B2 and has a sufficient torque capacity. Thus, it is possible to prevent the excessive tie-up, in which both the brakes B2 and B3 are applied, and accordingly the deterioration of the durability.

Figure 32:
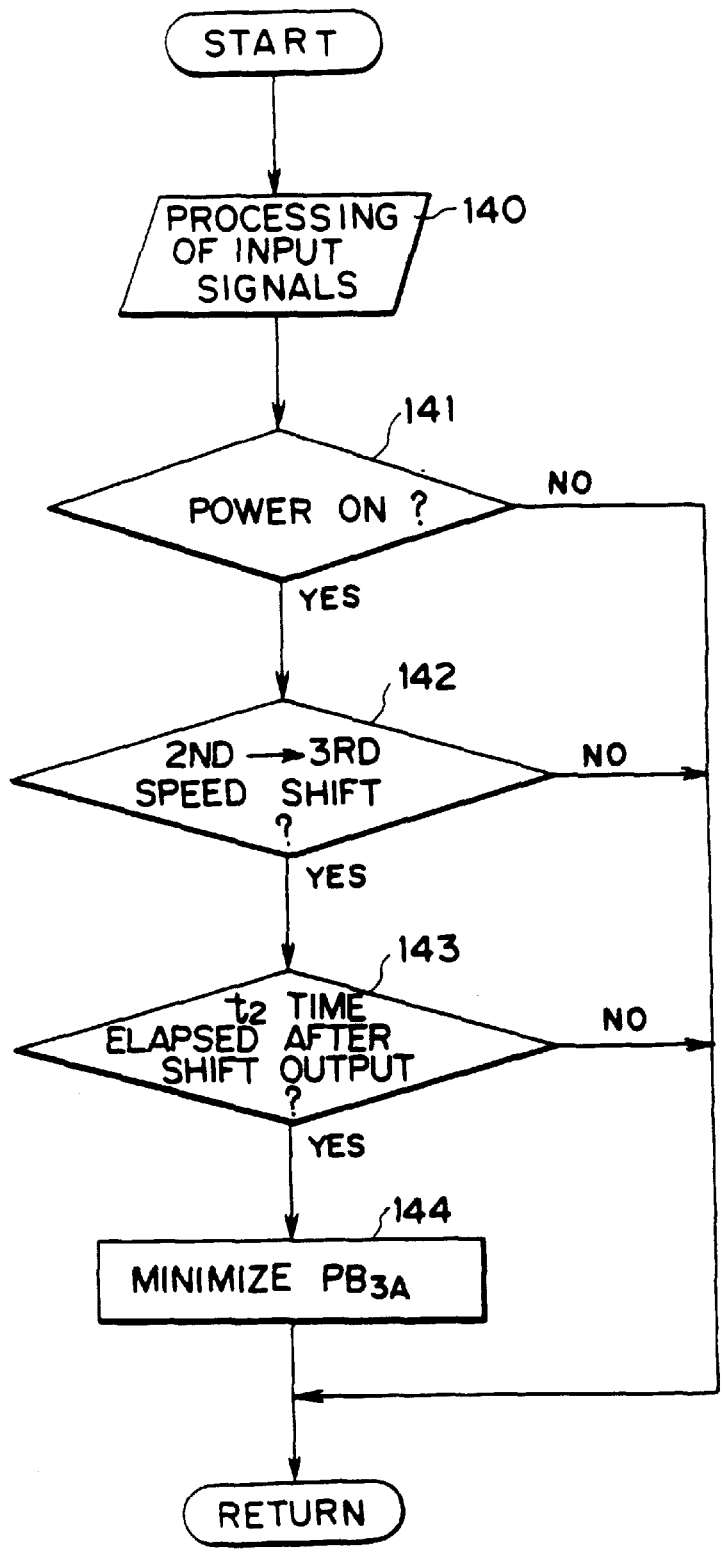
FIG. 32 is a flow chart showing a control routine for minimizing the supply pressure to the third brake by a timer.

Of the aforementioned controls, the operation of lowering the supply pressure PB3A from the line pressure and the operation of minimizing the same may be executed either by making a decision on the basis of the change in the R.P.M. of a predetermined rotary element or by controlling the timer. FIG. 32 is a flow chart showing a control routine of the case, in which the operation of minimizing the supply pressure PB3A is to be executed by controlling the timer. Specifically, after processing of the input signals (at Step 140), it is decided (at Step 141) whether or not it is in the power-ON state. This is because the overlap control is necessary in the case of the power-ON upshift. If in the power-ON state, it is decided (at Step 142) whether or not the shift from the 2nd to 3rd speeds is outputted. If this upshift to the 3rd speed is outputted, it is decided (at Step 143) whether or not the time period $t_2$ has elapsed from the shift output. If this answer is "YES", the supply pressure PB3A is minimized (at Step 144). Incidentally, the routine is returned if all the answers of Steps 141 to 143 are "NO".

The reason why the aforementioned supply pressure PB3A is substantially blocked is to prevent the excessive tie-up at the time of the clutch-to-clutch shift. In order to achieve this prevention directly, the supply pressure PB3A may be blocked on the basis of the detection of the tie-up. A control routine for this operation is shown in the form of a flow chart in FIG. 33. After processing of the input signals (at Step 150), it is decided (at Step 151) whether or not the shift from the 2nd to 3rd speeds is outputted. If this answer is "YES", it is decided (at Step 152) whether or not the tie-up occurs. This decision can be executed on the basis of the R.P.M. of a predetermined rotary element including the output R.P.M. If the answer is "YES", the supply pressure PB3A is minimized or blocked (at Step 153).

As is apparent from the construction shown in FIG. 5 or FIG. 30, the B3 apply valve 98 is caused to block the supply of the aforementioned supply pressure PB3A when the oil pressure of the second brake B2 is high, by having its control port fed with the oil pressure of the second brake B2. In case, therefore, the B3 apply valve 98 is stuck so that it cannot block the supply pressure PB3A, there occurs the excessive tie-up between the second brake B2 and the third brake B3. In order to prevent this tie-up, the B3 apply valve 98 may be constructed, as shown in FIG. 34.

Figure 34:
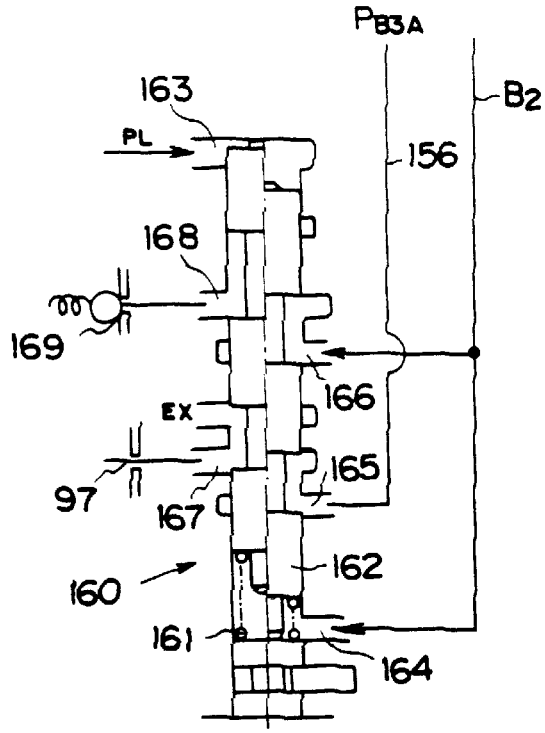
FIG. 34 is a diagram showing a B3 apply valve in case the pressure to a second brake is lowered by the B3 apply valve so as to prevent the tie-up.

In a B3 apply valve 160, as shown in FIG. 34, a first control port 163 to be fed with the line pressure PL is formed at the side opposed to a spring 161 across a spool 162 which is pushed upwards of FIG. 34 by the spring 161. In the position arranged with the spring 161, there is further formed a second control port 164 which is fed with the oil pressure of the second brake B2. The B3 apply valve 160 is further formed with two pairs of input and output ports 165, 166, 167 and 168 which are allowed to communicate with each other when the spool 162 is pushed down to a position, as shown at the righthand half of FIG. 34. Of these, the first input port 165 is connected with the oil passage 156 for feeding the supply pressure PB3A, and the second input port 166 is connected with the second brake B2. Moreover, the second output port 168 to communicate with the second input port 166 is connected with a relief valve 169.

With the construction shown in FIG. 34, therefore, the oil pressure of the second brake B2 can be lowered even if the B3 apply valve 160 is disabled to block the supply pressure PB3A by the valve stick or the like. Specifically, in case the B3 apply valve 160 has its spool 162 positioned at the righthand half of FIG. 34 despite that the oil pressure of the second brake B2 is in a high state, the first input port 165 and the first output port 167 communicate with each other to output the supply pressure PB3A. Simultaneously with this, however, the second input port 166 and the second output port 168 communicate with each other so that the oil pressure of the second brake B2 is lowered by the relief valve 169. As a result, the oil pressure of the second brake B2 will not exceed the pressure level which is set by that relief valve 169, so that the excessive tie-up and the accompanying deterioration of the durability can be prevented.

Figure 33:
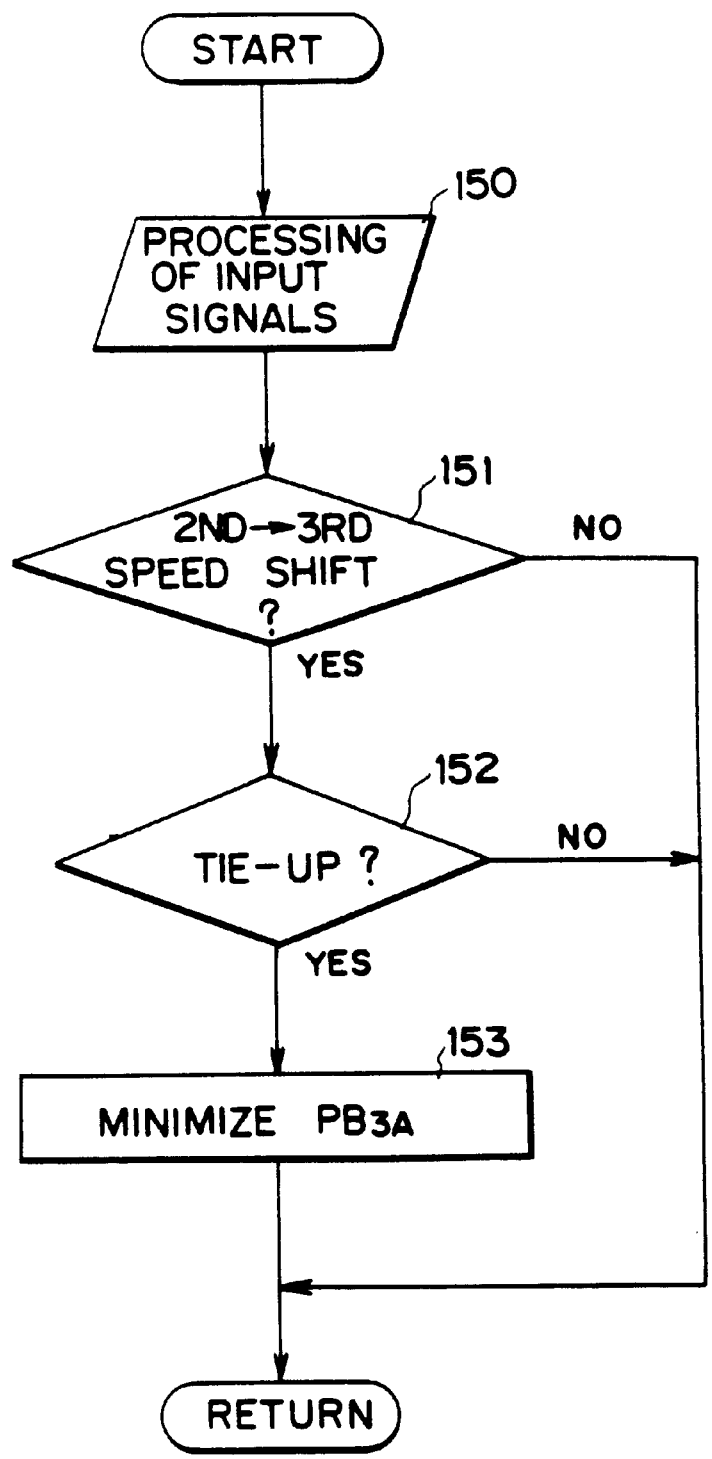
FIG. 33 is a flow chart showing a control routine for minimizing the supply pressure to the third brake by detecting the tie-up.
Figure 35:
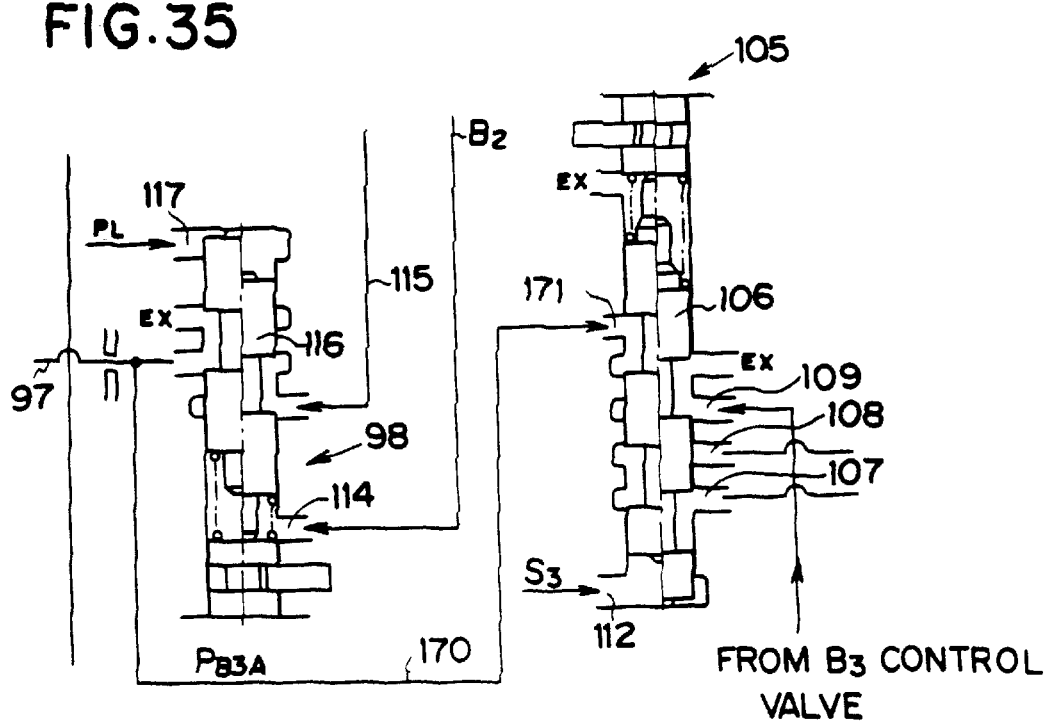
FIG. 35 is a diagram showing a portion of an oil pressure circuit in case the supply pressure to the third brake is drained by the orifice control valve.

Incidentally, in the control examples shown in FIG. 32 or 33, the supply pressure PB3A is minimized by the pressure control valve 140 so as to prevent the tie-up. This is substantially identical to a control of blocking the supply pressure PB3A, and a similar situation may be set by controlling the oil pressure outputted from the B3 apply valve 98. FIG. 35 shows an embodiment of the hydraulic circuit for that control, in which a drain oil passage 170 is connected with the oil passage 97 connecting the B3 apply valve 98 and the 2–3 timing valve 87. On the other hand, the orifice control valve 105 is further formed with a port 171 which is allowed to communicate with the drain port when the signal pressure is fed from the third solenoid valve S3. The aforementioned drain oil passage 170 is connected to the port 171.

Thus, if the lapse of the time period $t_2$ shown in FIG. 31 is decided or if the tie-up is decided, the third solenoid valve S3 is turned OFF to feed the signal pressure to the control port 112 of the orifice control valve 105. Then, the supply pressure PB3A is drained via the drain oil passage 170 and through the orifice control valve 105.

Figure 36:
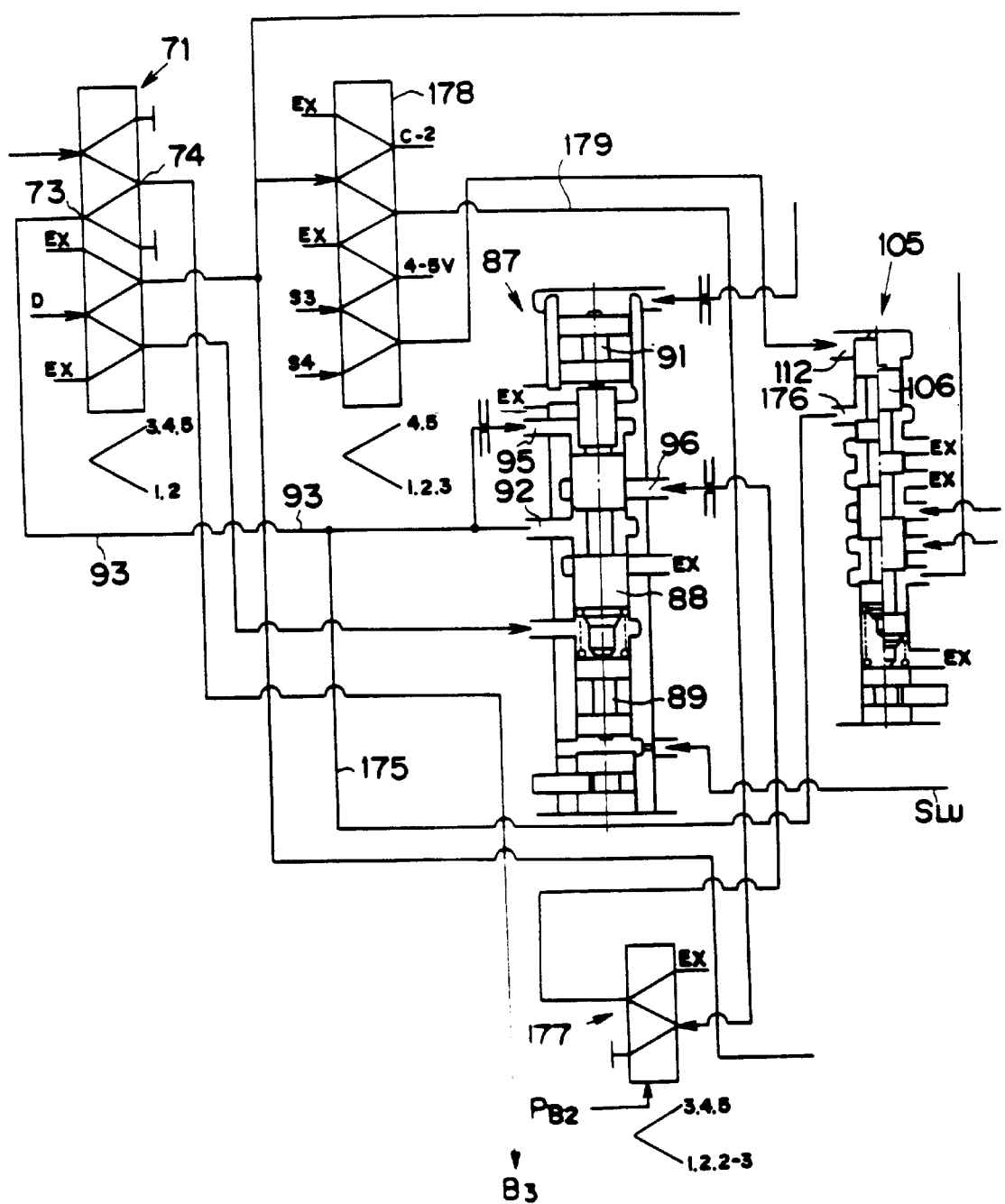
FIG. 36 is a diagram showing a portion of a further embodiment of the oil pressure circuit to be used in the present invention.

The embodiment shown in FIG. 35 is constructed such that the supply pressure PB3A outputted from the B3 apply valve 98 is blocked by the orifice control valve 105. This construction may be modified such that the supply pressure PB3A outputted from the 2–3 timing valve 87 to the third brake B3 is blocked by the orifice control valve 105, as exemplified in FIG. 36. In this modification shown in FIG. 36, an oil passage 175 is branched from the oil passage 93 leading from the 2–3 timing valve 87 to the 2–3 shift valve 71 and is connected to a port 176 of the orifice control valve 105. This port 176 is caused to communicate with the drain port when the spool 106 is pushed down to a position, as shown at the righthand half of FIG. 36, by feeding the signal pressure from the third solenoid valve S3. On the other hand, the hydraulic circuit shown in FIG. 36 is equipped with a solenoid relay valve 177 in place of the B3 apply valve 98. The relay valve 177 is substantially identical to the B3 apply valve 98 but is fed with the line pressure at a gear stage for a 3rd or lower speed via an oil passage 179 from a 3–4 shift valve 178, which is actuated by the signal pressure coming from the solenoid valve.

In the hydraulic circuit shown in FIG. 36, therefore, the third solenoid valve S3 is turned OFF to feed the signal pressure to the control port 112 of the orifice control valve 105, if the inertial phase is detected at the time of the upshift from the 2nd to 3rd speeds or if the predetermined time period $t_2$ elapses from the shift output. Then, the port 176 communicates with the drain port so that the drainage can be effected from the oil passage 175 and the oil passage 93. In short, the oil pressure to the third brake B3 can be drained to release the third brake B3. On the other hand, the original pressure to the third brake B3 is blocked if the 3–4 shift valve 178 is switched to the 4th speed side.

Figure 37:
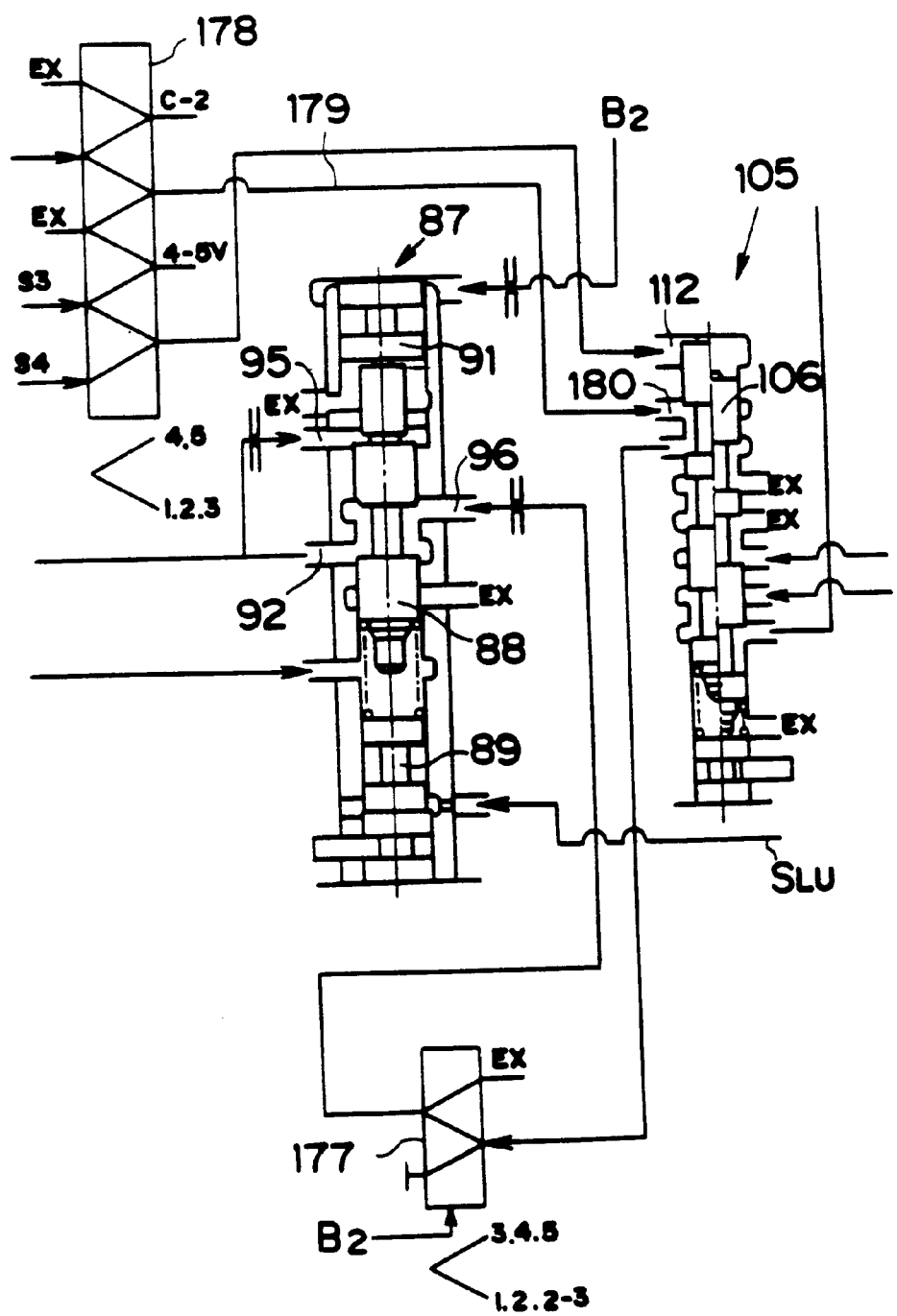
FIG. 37 is a diagram showing a portion of a further embodiment of the oil pressure circuit to be used in the present invention.

In an embodiment shown in FIG. 37, the oil passage 179 leading from the 3–4 shift valve 178 to the solenoid relay valve 177 is equipped with the orifice control valve 105. Specifically, the oil passage 179 of such port 180 of the orifice control valve 105 as is closed when the signal pressure is fed from the third solenoid valve S3. In the construction shown in FIG. 37, therefore, the feed of the oil pressure to the third brake B3 can also be blocked by controlling the third solenoid valve S3.

Figure 38:
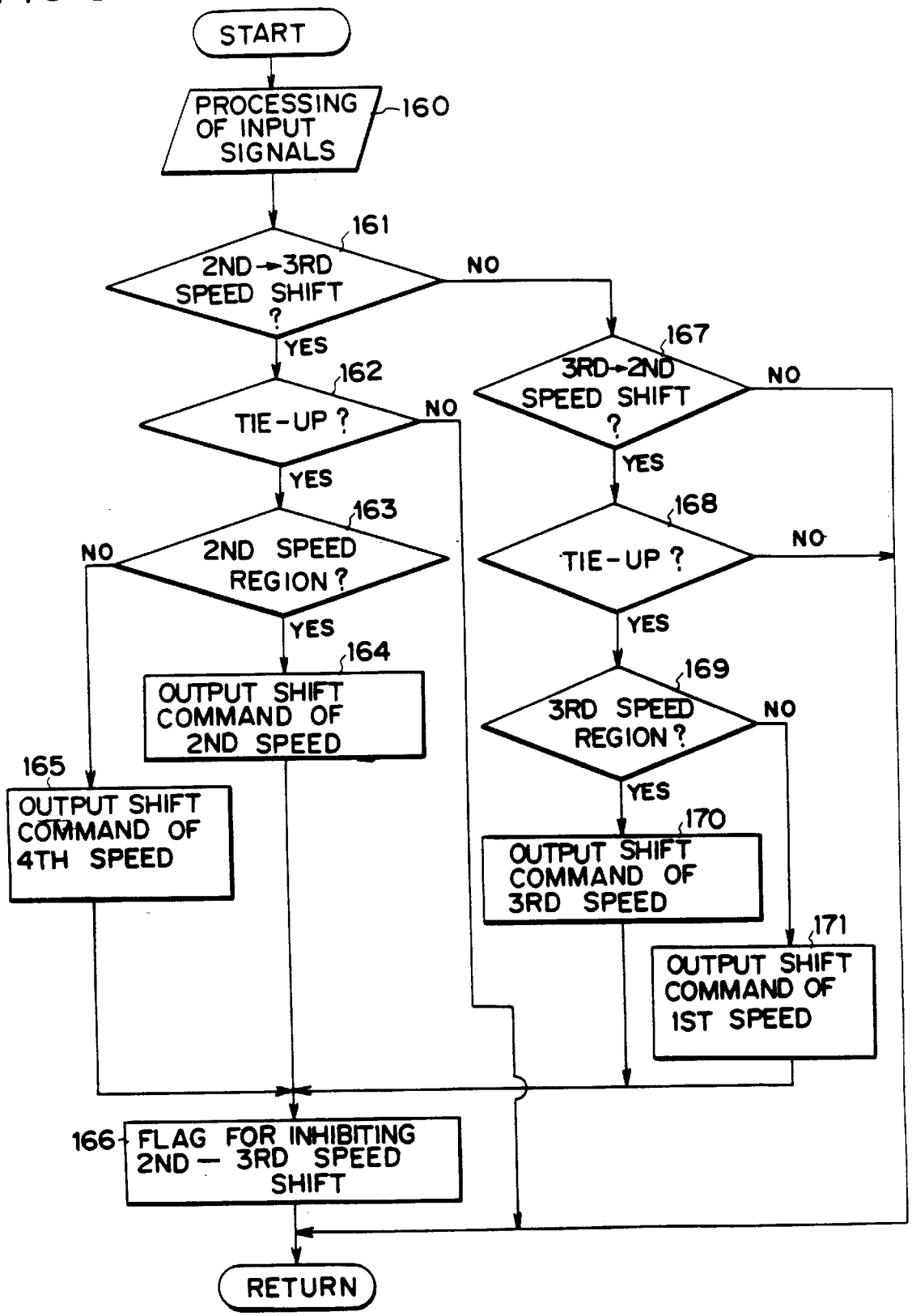
FIG. 38 is a flow chart showing a control routine for shifting to another gear stage in case the tie-up occurs during a clutch-to-clutch shift.
Figure 39A:
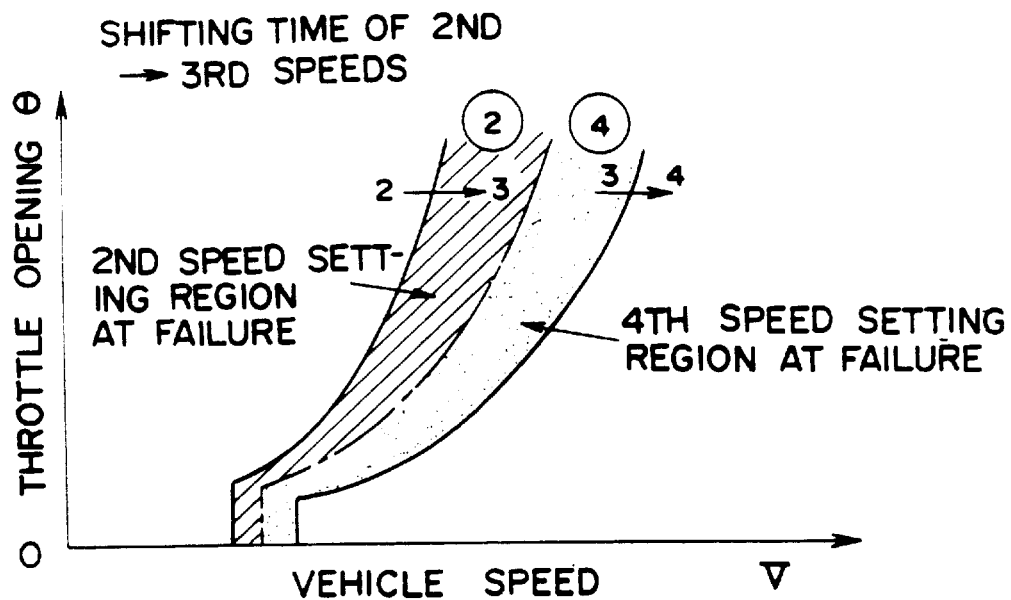
FIG. 39A is a shift diagram to be used for the control routine.

Here will be described a control of the case, in which the tie-up is decided during the clutch-to-clutch shift. If this shift is enforced in this case, it invites an excessive slip of the frictional engagement means to degrade the durability of the same. Hence, a gear stage for inviting no clutch-to-clutch shift is decided on the basis of the running state of the vehicle. As shown in FIG. 38, after processing of the input signals (at Step 160), it is decided (at Step 161) whether or not it is during the shift from the 2nd to 3rd speeds. If this answer is "YES", it is decided at Step 162 whether or not the tie-up has occurred. Since the tie-up will not occur without any failure, the control routine is returned in this case. In the case of a failure such as the failure of the linear solenoid valve SLU, the tie-up occurs. Then, it is decided (at Step 163) whether or not it is within the 2nd speed region. Specifically, if during the shift from the 2nd to 3rd speeds, the running state of the vehicle, as decided from the shift diagram, belongs to the third speed region. If the tie-up occurs, it is decided from the shift diagram shown in FIG. 39A, for example, which the gear stage to be set in place of the 3rd speed is for the 2nd speed or the 4th speed. Specifically, if the running state determined by the vehicle speed and the throttle opening belongs to a region ②, as shown in FIG. 39A, a shift command to the 2nd speed is outputted (at Step 164). On the other hand, if the running state belongs to a region ④, as shown in FIG. 39A, a shift command to the 4th speed is outputted (at Step 165). After either of these operations, a flag is set (at Step 166) for inhibiting the shifts between the 2nd speed and the 3rd speed.

Figure 39B:
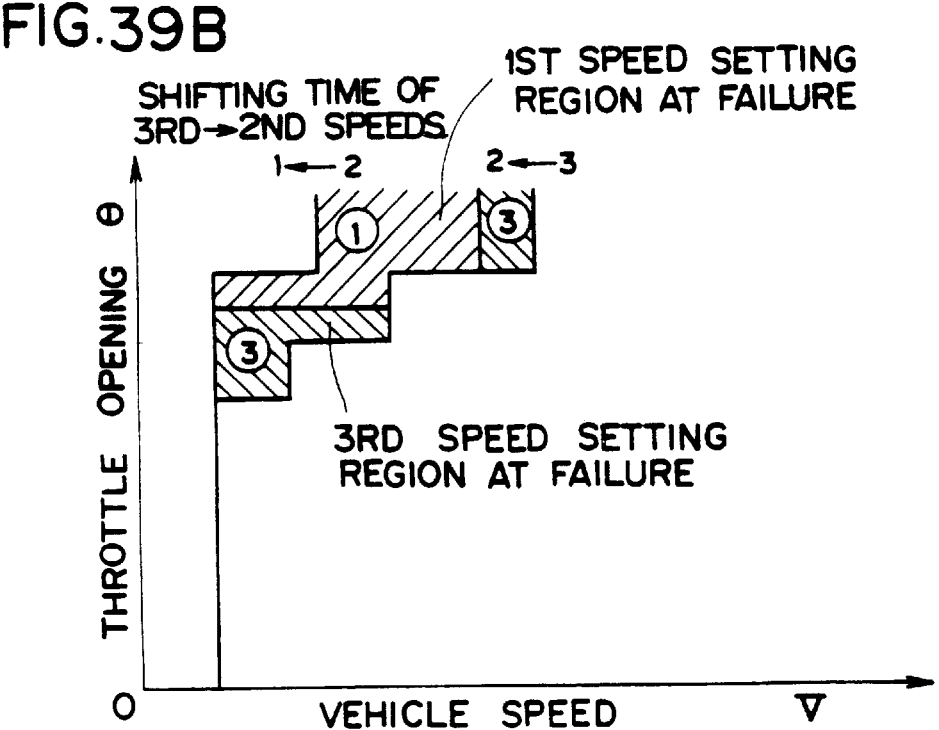
FIG. 39B is another shift diagram to be used for the control routine.

If the answer of Step 161 is "NO" because it is during the shifting from the 3rd to 2nd speeds and if the answer of subsequent Step 167 is "YES", the decision of the tie-up is executed (at Step 168), and whether or not it is in the third speed region is decided (at Step 169). If no tie-up occurs, the routine is returned. Moreover, the 3rd speed region is decided depending upon whether or not the running state determined from the vehicle speed and the throttle opening belongs to a region ③ in the shift diagram shown in FIG. 39B. Specifically, during the shift from the 3rd to 2nd speeds, the running state belongs to the 2nd speed region in the normal shift diagram. In case, however, the tie-up is decided, a gear stage to be set is decided on the basis of the shift diagram of FIG. 39B. At the time of a failure, moreover, a command for the shift to the 3rd speed is outputted (at Step 170) if it is decided that the running state is within the 3rd speed region. Otherwise, it means according to FIG. 39B that the running state belongs to a first speed region, as indicated at ①, and a command for the shift to the 1st speed is outputted (at Step 171). Incidentally, the 1st speed region ① or the 3rd speed region ③ is set to retain the driving force or to consider an overrun of the engine. After this, the routine advances to Step 166, at which the shift between the 2nd speed and the 3rd speed is inhibited. According to the control shown in FIG. 38, therefore, it is possible to avoid the tie-up and to set a gear stage suited for the running state.

Although the present invention has been described in connection with its embodiments, it should not be limited to the foregoing embodiments. Hence, the present invention can also be practiced either by a control system for an automatic transmission equipped with a gear train other than that shown in FIG. 2 by an automatic transmission equipped with a hydraulic circuit other than those shown in the drawings.

Here will be generally described the advantages to be obtained by the present invention. According to the shift control system of the present invention, a gear stage using predetermined frictional engagement means is inhibited, if the apply pressure of the engagement means cannot be regulated, when it is to be directly controlled, by a pressure regulating mechanism including a pressure regulating valve. As a result, the shifting shock can be prevented in advance from deteriorating.

Since the shift control system is constructed such that the original level of the apply pressure is lowered in the case of a shift in which the frictional engagement means having its apply pressure controlled directly by the pressure regulating mechanism is applied, a high oil pressure can be prevented from being abruptly fed to the frictional engagement means even in the pressure-unregulatable state, to prevent the torque capacity of the frictional engagement means from abruptly increasing and accordingly the shifting shock from deteriorating.

Moreover, by connecting an accumulator of another frictional engagement means as a damper for the frictional engagement means having its apply pressure controlled directly by the pressure regulating mechanism, the frictional engagement means can be prevented, when the pressure cannot be regulated, from having its apply pressure abruptly raised, and the number of parts can be decreased to reduce the size and weight of and the cost for the shift control system.

In this construction, still moreover, the changeover valve is connected between the pressure regulating mechanism and the frictional engagement means to be fed with the oil pressure regulated by the former, and is closed at the pressure unregulatable time to interrupt a fast application of the oil pressure to the frictional engagement means. As a result, the apply pressure to that frictional engagement means can be prevented from any abrupt rise, to prevent the shifting shock effectively.

In the present invention, furthermore, the oil pressure to be fed to one of the frictional engagement means to be possibly tied up is set to a low level, or its feed is interrupted after a predetermined time period or when the tie-up is detected. As a result, even if the oil pressures of the individual frictional engagement means are controlled independently of each other, any excessive tie-up can be avoided to prevent the durability of the frictional engagement means from deteriorating. According to the present invention, furthermore, when it is detected that the oil pressure to be fed to predetermined frictional engagement means cannot be blocked, the oil pressure is lowered so that the excessive tie-up can be avoided to prevent the durability of the frictional engagement means from deteriorating. According to the present invention, furthermore, in case an overlap control at the time of a shift is to be executed by the frictional engagement means having their oil pressures controlled independently of each other, the shift is inhibited by detecting a failure or the tie-up so that the excessive tie-up can be avoided to prevent the durability of the frictional engagement means from deteriorating.

What is claimed is:

1. A shift control system of an automatic transmission for setting a predetermined gear stage by applying first frictional engagement means and releasing second frictional engagement means, comprising:

a pressure regulating mechanism for regulating a oil pressure to be fed to or drained from said first frictional engagement means;

failure detecting means for detecting a failure of an apparatus to participate in the regulation and control of the oil pressure which is to be fed to or drained from at least one of said first and second frictional engagement means; and gear stage inhibiting means for inhibiting the setting of said predetermined gear stage when the failure is detected by said failure detection means, wherein said pressure regulating mechanism includes a pressure regulating valve for having its pressure regulating level changed on the basis of an output pressure coming from a valve for controlling a lockup clutch in said automatic transmission, and wherein said failure detecting means includes means for detecting the failure when said lockup clutch fails.

2. A shift control system according to claim 1, further comprising:

means for detecting a shifting from said first gear stage, which is set by releasing said first frictional engagement means and applying said second frictional engagement means, to said predetermined gear stage, wherein said gear stage inhibiting means includes means for executing a shift by changing said predetermined gear stage to a second gear stage when a shifting from said first gear stage to said predetermined gear stage is detected and when the failure is detected by said failure detecting means.

3. A shift control system of an automatic transmission for setting a transmission torque capacity of each of first and second frictional engagement means to not less than a predetermined value at a transitional time of a shift which is executed by releasing said first frictional engagement means and applying said second frictional engagement means, comprising:

tie-up detecting means for detecting a tie-up in which both said first frictional engagement means and said second frictional engagement means are given a predetermined or higher torque capacity to lower an output torque at said transitional shift time;

means for learning and controlling the reduction of the apply pressure of said first frictional engagement means in accordance with the tie-up state detected by said tie-up detecting means; and means for inhibiting the setting of the gear stage, which is effected by applying said first frictional engagement means and releasing said second frictional engagement means, when the learning and control cannot be executed.

4. A shift control system of an automatic transmission for setting a predetermined gear stage by applying first frictional engagement means and releasing second frictional engagement means, comprising:

a valve mechanism for lowering the oil pressure of said first frictional engagement means on the basis of the oil pressure of said second frictional engagement means;

pressure regulating means for regulating the oil pressure to be fed to and drained from said first frictional engagement means;

failure detecting means for detecting a failure of said pressure regulating means; and lowering means for lowering the oil pressure of said first frictional engagement means when the failure is detected.

5. A shift control system according to claim 4, wherein said pressure regulating means includes: a solenoid valve for outputting a signal pressure according to electric signals; and a pressure regulating valve having its pressure regulating level changed according to the signal pressure, and wherein said lowering means includes means for lowering said signal pressure.

6. A shift control system according to claim 4, wherein said pressure regulating means includes: a solenoid valve for outputting a signal pressure on the basis of electric signals; and a valve actuated by said signal pressure for draining said first frictional engagement means.

7. A shift control system of an automatic transmission for setting a predetermined gear stage by applying first frictional engagement means and releasing second frictional engagement means, comprising:

a pressure regulating mechanism for regulating a oil pressure to be fed to or drained from said first frictional engagement means;

failure detecting means for detecting a failure of an apparatus to participate in the regulation and control of the oil pressure which is to be fed to or drained from at least one of said first and second frictional engagement means; and gear stage inhibiting means for inhibiting the setting of said predetermined gear stage when the failure is detected by said failure detection means, wherein said failure detecting means includes means for detecting the failure when a time period from an instant when a shift command is outputted to the instant when an inertial phase is started exceeds a predetermined value.

* * * * *